(12) United States Patent
Ng et al.

(10) Patent No.: US 6,560,052 B2
(45) Date of Patent: *May 6, 2003

(54) IMPLEMENTATION OF VARIABLE BIT DENSITY RECORDING IN STORAGE DISC DRIVES

(75) Inventors: Wei Loon Ng, Singapore (SG); Beng Wee Quak, Singapore (SG); Wing Hung Chan, Singapore (SG); Swee Kieong Choo, Singapore (SG); Choon Wei Ng, Singapore (SG); Teck Khoon Lim, Singapore (SG)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,737

(22) Filed: Jul. 12, 1999

(65) Prior Publication Data

US 2002/0141099 A1 Oct. 3, 2002

Related U.S. Application Data

(63) Continuation-in-part of application No. 09/167,808, filed on Oct. 7, 1998.
(60) Provisional application No. 60/092,838, filed on Jul. 13, 1998.

(51) Int. Cl.⁷ .................................................. G11B 5/09
(52) U.S. Cl. ............................... 360/48; 360/31; 360/53
(58) Field of Search ......................... 360/48, 75, 77.07, 360/49, 53, 31

(56) References Cited

U.S. PATENT DOCUMENTS

| | | | |
|---|---|---|---|
| 3,947,876 A | | 3/1976 | Gray |
| 4,945,427 A | | 7/1990 | Cunningham |
| 5,296,979 A | | 3/1994 | Kawabe et al. |
| 5,561,566 A | * | 10/1996 | Kigami et al. ............... 360/48 |
| 5,596,458 A | * | 1/1997 | Emo et al. .................. 360/48 |
| 5,822,142 A | * | 10/1998 | Hicken ....................... 360/53 |
| 5,870,237 A | | 2/1999 | Emo et al. |
| 6,182,250 B1 | * | 1/2001 | Ng et al. ..................... 714/704 |

* cited by examiner

*Primary Examiner*—David Hudspeth
*Assistant Examiner*—Varsha A. Kapadia
(74) *Attorney, Agent, or Firm*—Timothy B. Scull; Merchant & Gould P.C.

(57) ABSTRACT

The present invention pertains to an apparatus and method for recording data in a variable bit density disc drive. The disc drive includes a recording surfaces, each having a corresponding head for recording data on the recording surface. At least one head is operated at a different recording frequency from the other heads, creating a variable bit density for the different recording surfaces. The combination of head recording frequencies is determined following an error testing operation and a unique physdisc lookup table is created based on the determined recording frequencies. The physdisc lookup table is used to allocate data sectors and to convert between logical and physical block addresses.

14 Claims, 14 Drawing Sheets

IMPLEMENTATION OF VARIABLE BIT DENSITY RECORDING IN STORAGE DISC DRIVES

RELATED APPLICATIONS

This application is a continuation-in-part of U.S. patent application Ser. No. 09/167,808, entitled IMPLEMENTATION OF VARIABLE BIT DENSITY RECORDING IN STORAGE DISC, filed Oct. 7, 1998. This application also claims the benefit of U.S. Provisional Application No. 60/092,838, entitled ALLOCATION OF SECTORS IN A VARIABLE BIT STORAGE DISC DRIVES WITHOUT PREDEFINED FORMATS, filed Jul. 13, 1998. This invention is also intended to further optimize variable bit density recording as previously disclosed in U.S. application Ser. No. 08/857,519, filed May 16, 1997, entitled VARIABLE BIT PER INCH RECORDING.

BRIEF DESCRIPTION OF THE INVENTION

The present invention relates generally to the storage of information on data storage mediums. More particularly, the invention relates to variable bit density recording in data storage mediums.

BACKGROUND OF THE INVENTION

Disc drives have utilized circular tracks for recording information on discs having a magnetic coating on the surface. It is a goal of a disc drive designer to provide as much storage capacity as possible. For a given physical structure, this can be accomplished by increasing the amount of data recorded on a track.

The surfaces of each disc have been divided into recording zones and the frequency of recording within a zone is maintained constant in order to maintain a relatively constant bit density across the recording surface. The recording frequency in each zone differs. The recording bit density in each zone is a function of the ratio of the recording frequency over the linear velocity of the rotating disc drive. Thus, the recording bit density in each zone is the same across each disc.

FIG. 1 illustrates the recording zones in a typical hard drive. There is shown a pair of discs 100 and 102 in a disc drive, each disc having recording zones defined as Z1, Z2, and Z3. The zones in the two-disc drive are vertically aligned and the boundaries of the zones are defined radially by the distances indicated by R1–R4 based on the distance from the center C of the disc. The recording frequency used in each zone of each disc is the same. Thus, the recording frequency used in Zone Z1 of disc 1 is the same as that used in zone Z1 of disc 2. Furthermore, the recording bit density associated with zone Z1 of disc 1 is the same as that used in zone Z1 of disc 2. The zones are numbered such that the recording frequency decreases as the linear velocity decreases as the zone number increases.

The recording frequency used within each of the zones is determined at the design stage based on various factors, including an expected nominal head read/write performance for the heads to be used in the drive. The performance of each head with its respective surface is measured to determine if it met the minimum performance standard threshold. If any of the heads in a disc array failed to reach at least the minimum threshold, the drive was considered unacceptable and was shipped unless the head could be replaced to meet the minimum performance standard.

The replacement of a failed head can become an expensive task. In some cases, a failed head can miss the minimum performance standard threshold by a slight margin. In these cases, the replacement of the failed head is needless and it is more economically feasible to attempt to accommodate for the lost storage capacity.

SUMMARY OF THE INVENTION

The present invention pertains to an apparatus and method for recording data in a data storage medium. One such data storage medium is a disc drive having at least two recording disc surfaces such as a disc drive having a number of discs, each of which have at least one recording surface. Each recording surface is associated with a read/write head that records and accesses data from the surface. Each recording surface is partitioned into a number of zones. Each zone is vertically aligned with a same zone on each surface of each disc. The zone boundaries on all surfaces of the disc drive are the same. The recording frequency for each zone on all surfaces can differ for each read/write head in order to compensate for a read/write head that cannot meet the BPI error rate threshold.

In accordance with preferred aspects of the present invention, the present invention comprises an apparatus for recording computer readable information on recording surfaces using heads wherein each recording surface having one associated head for recording data to the recording surface. At least one head operates at an actual recording frequency less than the actual recording frequency of one of the other heads according to a dynamically generated physdisk lookup table comprising information related to the different heads and the different recording frequencies. The apparatus includes a microprocessor for controlling the allocation of data using the dynamically generated physdisk lookup table.

In accordance with other preferred aspects, each head and recording surface relates to a predetermined preferred recording frequency and the average value of the actual recording frequencies for the heads is not less than the predetermined preferred recording frequency. Additionally, the physdisk table is generated following error testing of the heads and comprises information used for converting between logical block addresses and physical block addresses. The variable bit density disk drive is capable generating a number of unique physdisk tables equal to a value related to the number of possible bit densities raised to the power of a value related to the number of heads in the disk drive.

In accordance with other preferred aspects, the present invention relates to a method of recording data on a data storage medium having a plurality of recording surfaces and a plurality of heads, each head associated with a particular recording surface wherein the method comprises the following steps: testing the heads to determine error rate characteristics for each head; determining a recording frequency for each head with respect to a predetermined average frequency and maximum error rate criteria; generating a physdisk lookup table based on the determined recording frequencies for the heads; and using the physdisk lookup table to allocate data sectors on the recording media.

These and various other features as well as advantages which characterize the present invention will be apparent from a reading of the following detailed description and a review of the associated drawings.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION

Figure 2:
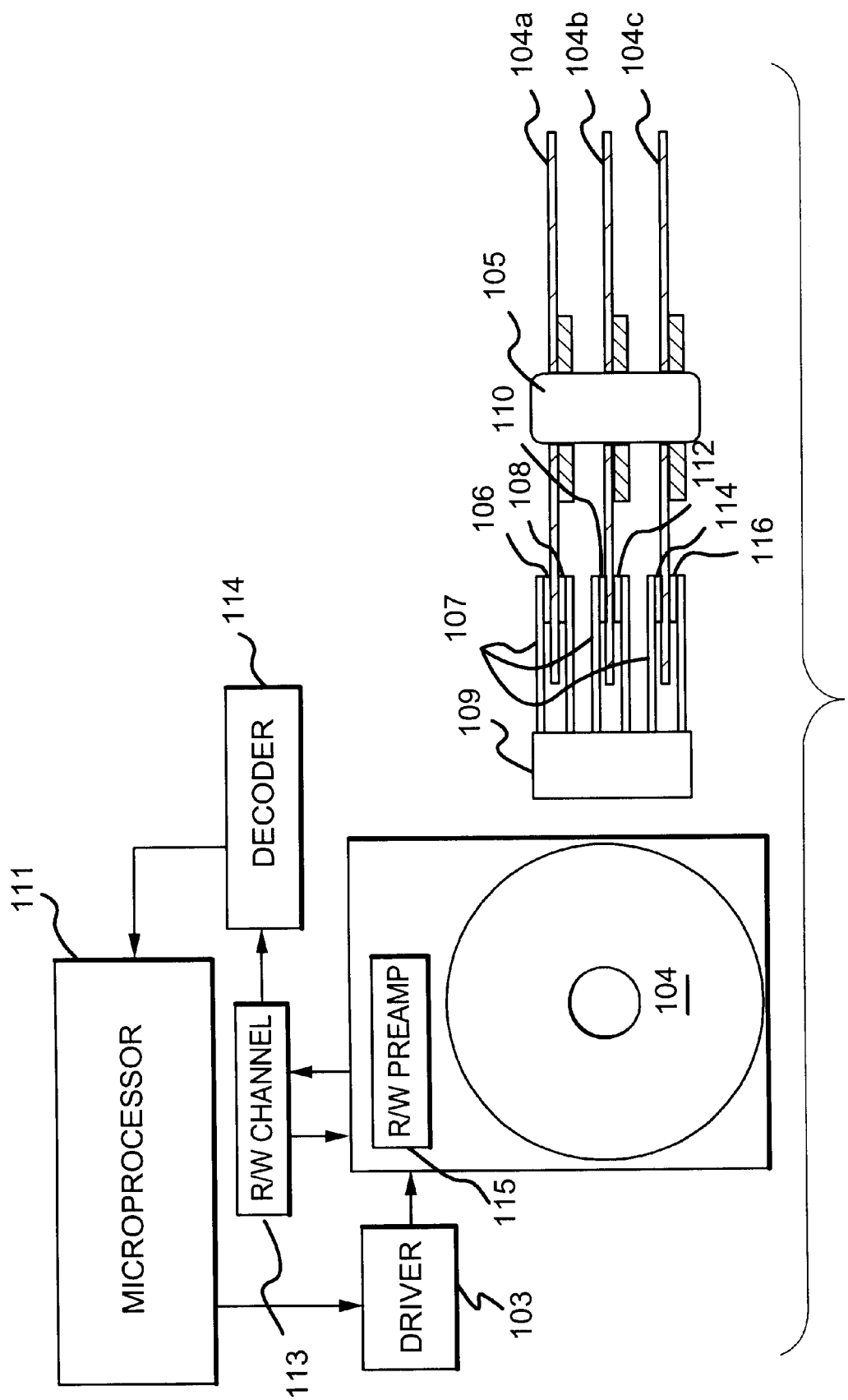
FIG. 2 illustrates an exemplary disc drive in accordance with a preferred embodiment of the present invention.

FIG. 2 illustrates the basic elements of a disc drive system in which the present invention would be useful. The system includes three disc platters 104A–104C and six recording heads, 106, 108, 110, 112, 114 and 116. Each disc platter 104 is associated with a pair of the recording heads. For example, disc platter 104A has a first recording head 106 that is used to read/write data on the top surface of the disc platter 1 04A and a second recording head 108 that is used to read/write data on the bottom surface of the disc platter 104A. Each pair of read/write heads is mounted on an actuator arm 107 to be positioned over selected tracks on the discs 104. A spindle motor 105 spins the discs at a constant speed to cause the heads to fly over the surface of the disc, while an actuator drive circuit 103 powers the coils 109 to move the actuator arms and the heads to a selected track.

A microprocessor 111 contains firmware to control the actuator arm position and read/write to the recording disc media. The "physdisc" table which is the subject of this invention is stored herein; this table is used to determine the surface recording density of each recording media on the disc drive. The disc drive further includes a read/write channel 113 which processes the analog signals to digital form; a decoder circuit 114 which decodes data read from the read/write channel to form usable by the microprocessor; in a read/write preamplifier 115 where amplifying the signals read from the disc 104.

Figure 1:
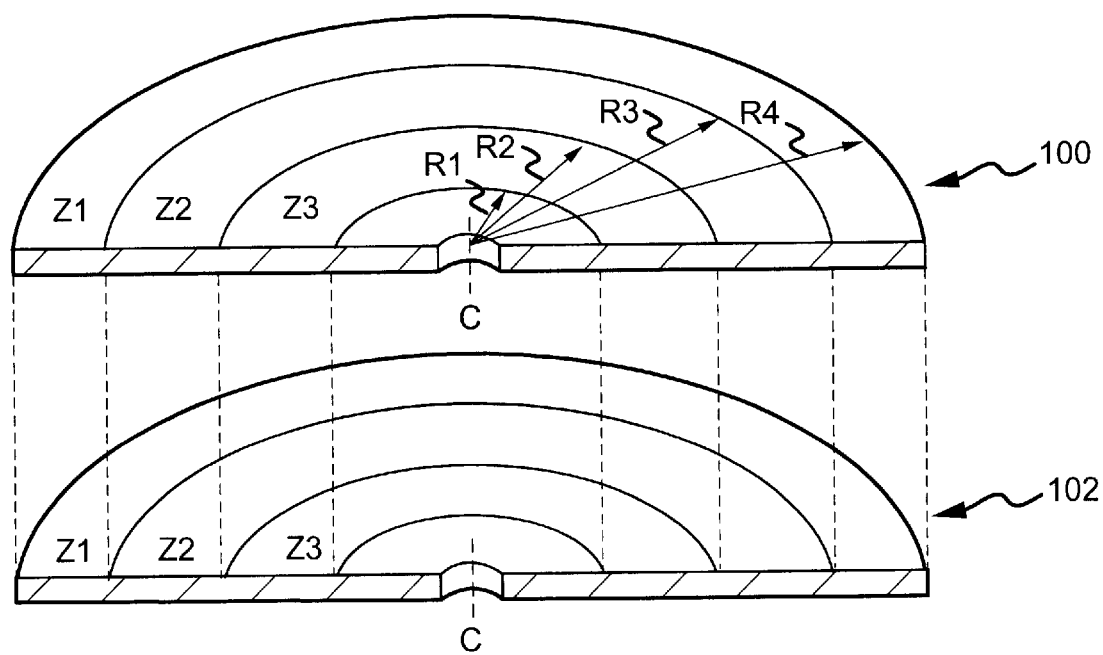
FIG. 1 illustrates a zone layout for a pair of magnetic recording discs.
Figure 3:
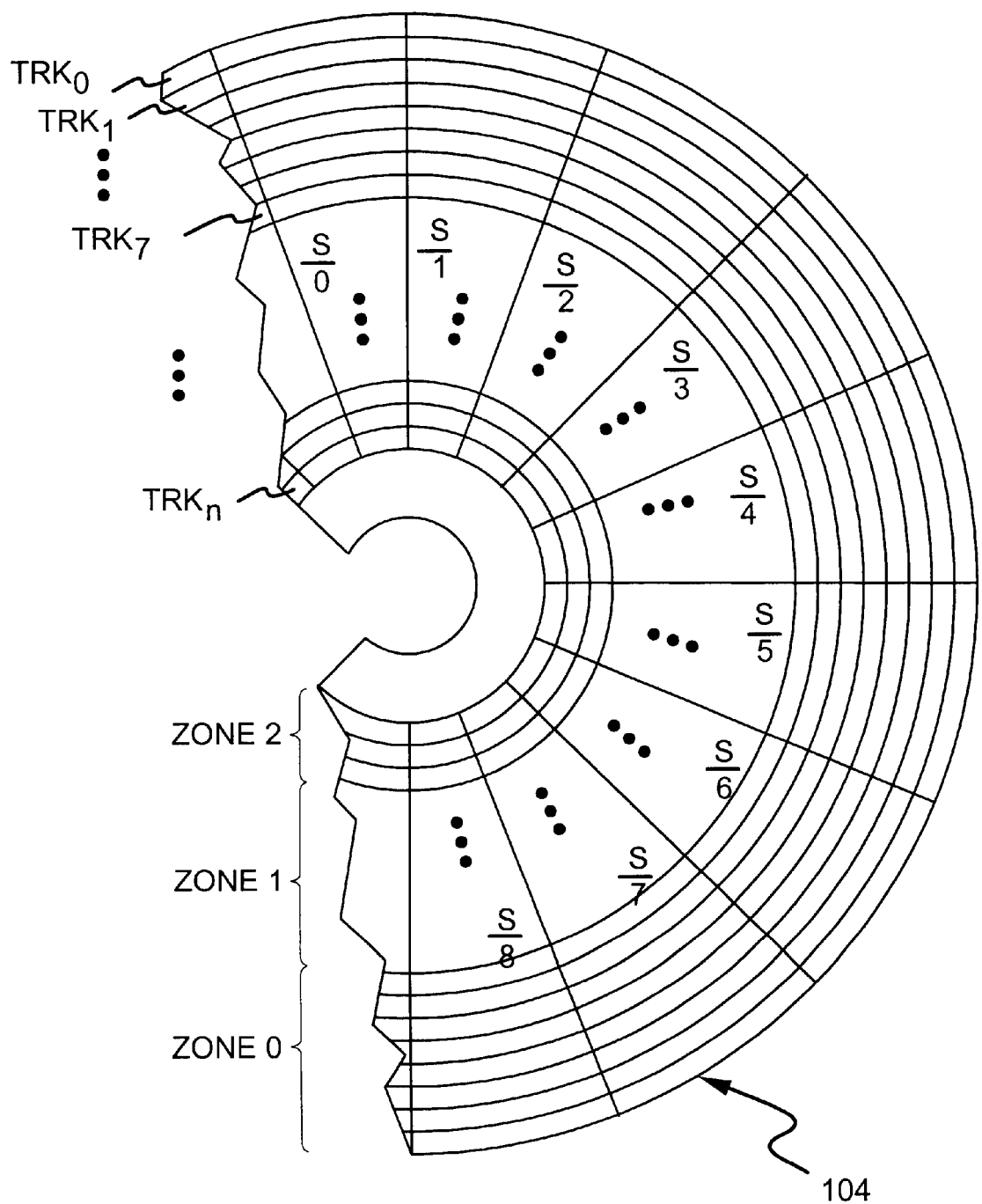
FIG. 3 illustrates an exemplary recording surface layout in accordance with a preferred embodiment of the present invention.

FIG. 3 illustrates an exemplary surface of a disc platter 104. The planar surfaces of each disc platter is coated with a suitable magnetic material to provide for the recording of digital signals on the media. Each surface is partitioned into a number of zones. As shown in FIG. 3, there are three such zones labeled Zone 0, Zone 1, and Zone 2. Each zone is associated with a recording frequency that maintains a relatively constant bit density across the recording surface. The recording frequency in each zone differs. The bit density in each zone is a function of the ratio of the recording frequency over the linear velocity of the rotating disc drive. Furthermore, as shown in FIG. 1, each zone boundary is vertically aligned in each surface of the drive and each zone boundary remains uniform for the same zone on all surfaces.

Data is recorded in sectors along concentric tracks. In FIG. 3, there is shown eight sectors labeled S0–S8 and a number of concentric tracks labeled $TRK_0$–$TRK_N$. The sectors are distributed on the surface such that they are identified by a track, head, and sector number. Every sector has a unique address, known as a physical block address (PBA), which identifies the physical location of the data stored on the disc at a particular sector, head, and track.

Figure 4:
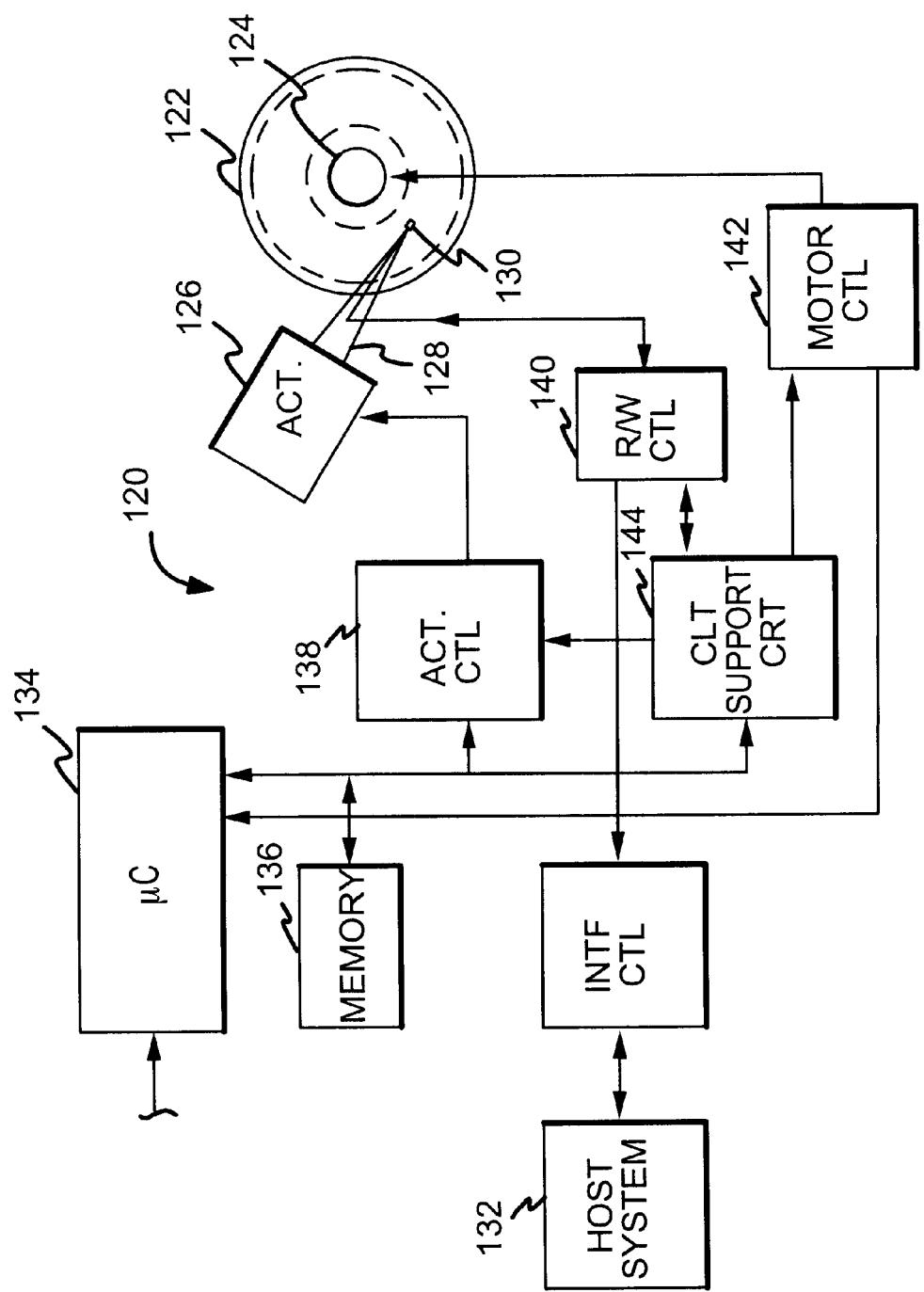
FIG. 4 illustrates a disc drive controller in accordance with a preferred embodiment of the present invention.

FIG. 4 illustrates a disc drive system controller 120 utilizing the technology of the present invention. There is shown a magnetic disc platter 122, driven by a spin motor 124, an actuator 126 for the proper positioning of an arm 128, and one or more heads 130 that read or write data from a sector on the magnetic surface of the disc. It should be noted that for illustration purposes only there is only one head 130 and disc platter 122 shown in FIG. 4. Typically, there are multiple heads and disc platters associated with a disc drive as is shown in FIG. 2.

The operation of the spin motor 124 and actuator assembly 126, 128, 130 are well known in the art. The disc drive system controller 120 performs all the essential support processes necessary to permit an external host system 132, typically a data processing system such as but not limited to a personal computer or the like, to store and retrieve data from the disc 122. There is a microcontroller 134 and a memory 136 that is used to store program and data for the microcontroller 134. The microcontroller 134 controls the operations of the various components of the disc drive system 120 in order to access data from the disc 122. The physdisc table (discussed in detail below) is preferably stored in memory 136; the table entries determine the surface recording bit density of each media surface on the disc drive.

The actuator controller 138, under the control of the microcontroller 134, drives the electromagnetic positioning voice coil of the current drive level provided to the actuator 126. The read/write controller 140, under the control of the microcontroller 134, supports read and write operations to the disc 122. Additional hardware support for the actuator controller 138, motor controller 142, and read/write controller 140 is provided by the control support circuitry 144. The functions of the control support circuitry 144 are generally to process sector servo bursts and to provide control signals to the actuator 138, spin motor 142 and read/write 140 controllers.

Figure 5:
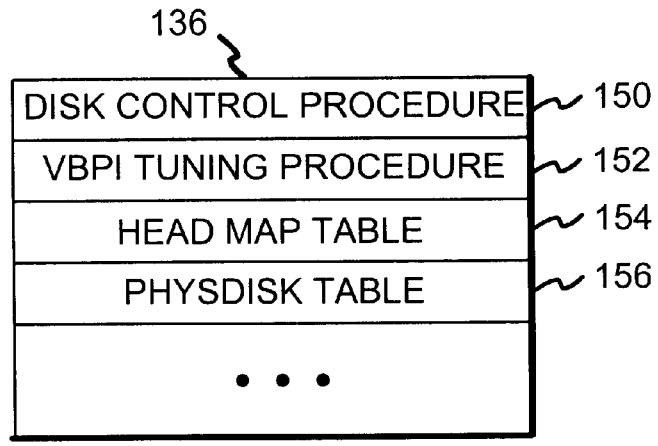
FIG. 5 illustrates the memory shown in FIG. 4 in accordance with a preferred embodiment of the present invention.

FIG. 5 illustrates the memory 136 of the disc drive controller 120. There is shown the following:

- a disc control procedure 150 that controls the disc recording and retrieval operations:
- a variable bit per inch (VBPI) tuning procedure 152 that is used to determine the recording bit density or bit per inch (BPI) of a read/write head:
- a head map table 154 that is used to map logical heads to a corresponding physical head;
- a physdisc table 156 that contains the recording frequency used for each read/write head in each zone in each recording surface. It should be noted that there is typically a physdisc table entry for each disc; the physdisc table can reside in a predetermined location on a disc or in a region of memory 136;
- as well as other data and procedures.

The disc drive controller 120 is used to perform the data recording and retrieval operations associated with the disc drive. In addition, the disc drive controller is used to perform the VBPI tuning process which is discussed in detail below.

In the preferred embodiment of the present invention, the recording bit density associated with a read/write head can differ for each zone on each recording surface in the disc drive. In the prior art, the recording bit density is the same for each zone on each surface of the disc drive. However, in many cases, a head/media combination may not be capable of achieving the target threshold recording bit density. In this case, the head/media combination is associated with a different recording bit density as assigned by the physdisc table. In order to maintain the same storage capacity, while the recording bit density for the head/media combination not satisfying the threshold is decreased, the recording bit density is increased in the same zone in one or more of the other head/media combinations, all under control of the physdisc table.

An example of how this is achieved will now be given with respect to a typical disc drive which utilizes three platters, each having a recording surface on either side, and six heads, one head being associated with each recording surface. Obviously, the same principles will apply for any disc drive having two or more platters. The invention of variable bit per inch tuning is implemented as follows. The VBPI tuning is conducted when the drive is first manufactured. The disc drive goes through a series of self-tests, i.e., when power is first applied to the disc drive the firmware in the drive tests itself through completion. The invention is implemented by determining the quality of each read-write head/media combination (which may be referred to hereafter simply as "head") before actual data is written to or read from the disc media. The testing procedure which is utilized when manufacturing of the disc is completed is as follows. The disc drive is put into a huge oven to control the temperature it is exposed to during testing and is powered up. The disc drive spins up in servo calibration and servo related testing is performed. The BPI testing for error rate is performed next; this testing will be discussed further below. The error rate of each head in the drive is determined at this point.

Based on the quality of the heads, that is, on the ability of the head to record or read data with an acceptable error rate relative to the target error rate, a most appropriate physdisc, i.e., a control table which sets the recording rate for each head media combination in the disc drive, is chosen from a set of available physdiscs to be used for this particular disc drive. Using the chosen physdisc which also describes the zones and sectors layout of the drive, the entire drive is now written with usable addressable sectors. This is also called "formatting" the disc drive. Next, these formatted sectors are read back to determine which are the bad ones. The unusable sectors will be marked bad and not used in the future. The VBPI tuning is now complete.

To complete testing, the temperature of the oven can be varied and the disc drive put into rigorous read/write tests to test its reliability. If the drive passes all test requirements, it can be shipped out as a good disc drive. The use of a selected physdisc from a set of available physdiscs for each disc drive allows the performance of each head (i.e., head/media combination) to be optimized. By optimized, it is meant that any head which falls below the target recording rate is set to record data a slightly lower rate so that it does not fail. To make up for the lower data recording rate from this single head, one or more of the other heads are pushed at a slightly higher recording rate than the optimum or target rate. However, this adjusted rate at which the heads are pushed is not set so high as to cause these heads which are now recording at a higher rate to also fail. Thus, the target recording rate for the entire system is optimized.

Figure 6A:
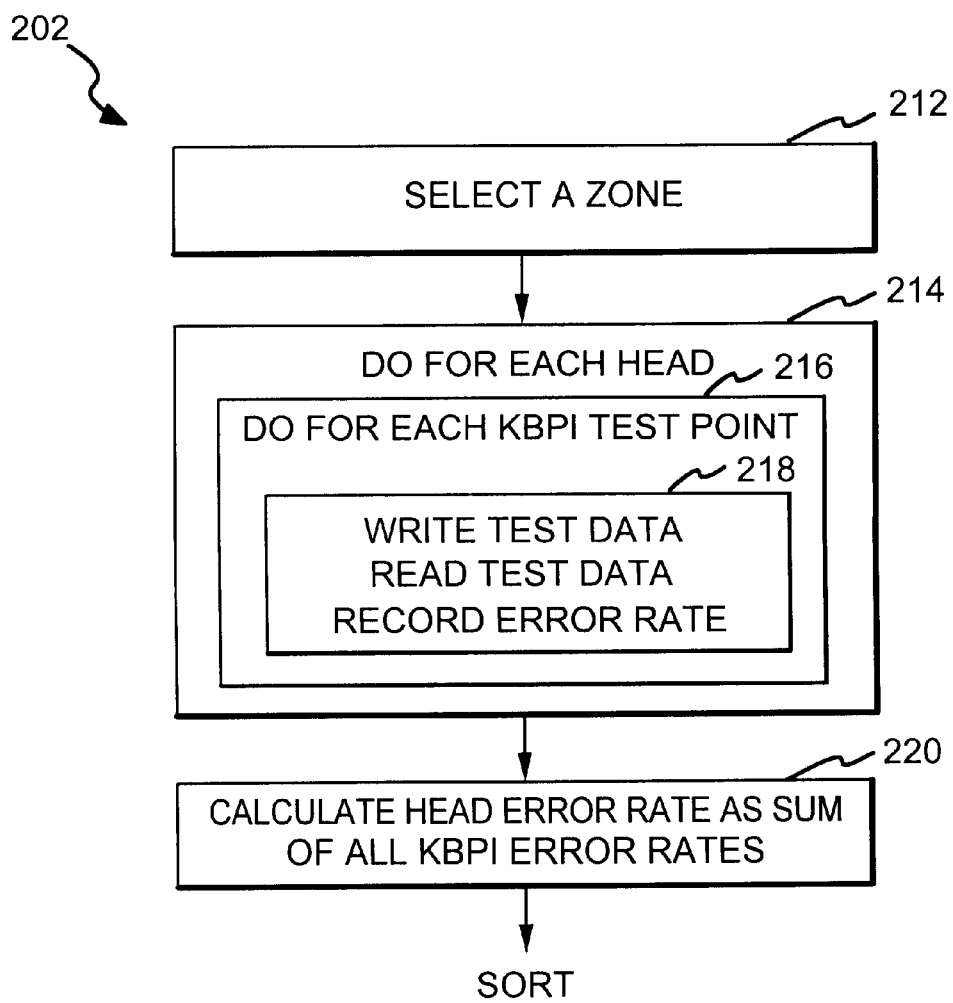
FIG. 6A is a flow chart illustrating the steps used to determine the BPI error rate for each head in a preferred embodiment of the present invention.

Referring next to the actual testing which must be conducted to establish the head/error rate, and referring to FIG. 6A, the testing sequence 202 begins with selection of a user data zone on each disc for BPI error rate read/write testing. The same, corresponding zone on each disc is selected. Then taking each head, data is written with a plurality of different data rates in kilobits per inch (KBPI) onto each disc at the selected zone. After a plurality of KBPI tests have been conducted at step 216, the data is read back and an error rate recorded at step 218. After a number of data rates have been used with each head, a graph of the performance of all the heads in a given disc drive can be developed as shown in FIG. 6B.

As a next step, the total error rate for each head is sorted in ascending order. Therefore, considering the example in FIG. 6B, the heads would be rated in the following order in terms of their BPI error test rate performance. Head 0 and head 1 are the weakest heads, compared to the rest of the heads. Assuming the drive is operating at 120 KBPI, and the error rate test limit is 750, then head 1 with an error rate of 970 would fail the test if no margin above or below the standard data rate for each head is utilized. This could be represented by a table which is labeled P43N0P0, where P43 identifies the disc drive, N0 represents the negative margin allowed for the head, and P represents the positive margin assigned for the head. According to this invention, a plurality of tables are available in a disc drive, which would assign some margin above or below the nominal KBPI recording rate for each head, so that the heads which were weak or would fail if operated at a normal rate can now be operated with a negative margin and therefore operate at a data rate at which they would not fail; and by the same token, other heads would be assigned by the physdisc table to operate at a positive margin, or be driven at a slightly higher data rate so that the total capacity of the disc drive would still be achieved. In this particular example, we wish to assign a suitable VBPI physdisc to the drive which would enable head 1 to reduce its operating KBPI value and pass the error rate test, while driving at least one other head at a slightly increased marginal error rate.

We have already established that in each disc drive, according to this invention, a plurality of physdisc tables can be stored. The nominal one of these physdisc tables, assigns no margin to any head so that the same recording density is used throughout the drive. We must now select an alternative physdisc table for the disc drive which is the subject of this test, so that the disc drive will operate successfully and store the target amount of data. In the example selected for this particular line of disc drives, two further physdisc table settings are available, P43N2P1 and P43N4P2. The physdisc P43N2P1 means the two weakest head use −2 KBPI less than the default setting, while the four better heads will use +1 KBPI more on top of the default setting for recording across the whole drive (not just for recording in the single zone where the recording efficiency was being tested). It is apparent, of course, that these numbers −2 and +1 could represent actual reductions and increases in the KBPI setting, or percentage reductions and increases from the same KBPI rate. Alternatively, a physdisc table P43N4P2 means that the two weakest heads would be operated at −4 KBPI, and the four strongest heads would be operated at +2 KBPI. Of course, it can be seen that these settings, when summed together, result in the total data recording rate across the entire drive achieving the target designation for the drive so that the drive remains a good drive.

Figure 6B:
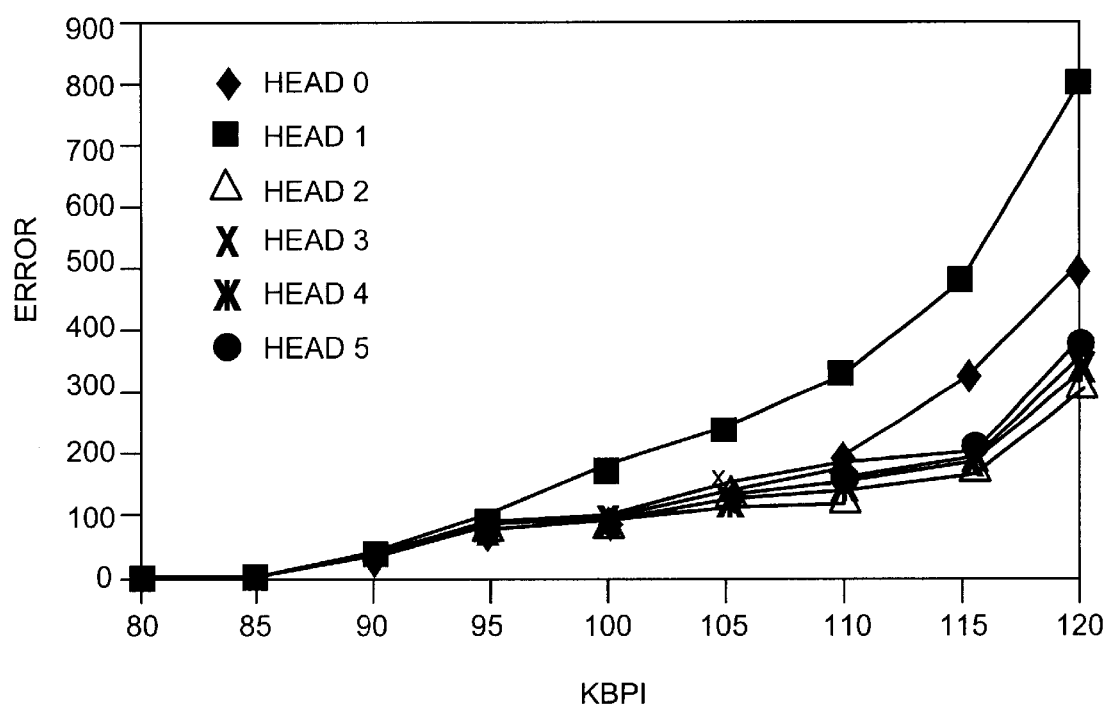
FIG. 6B is a graph illustrating exemplary KBPI error rates at each KBPI test point for each read/write head.
Figure 7A:
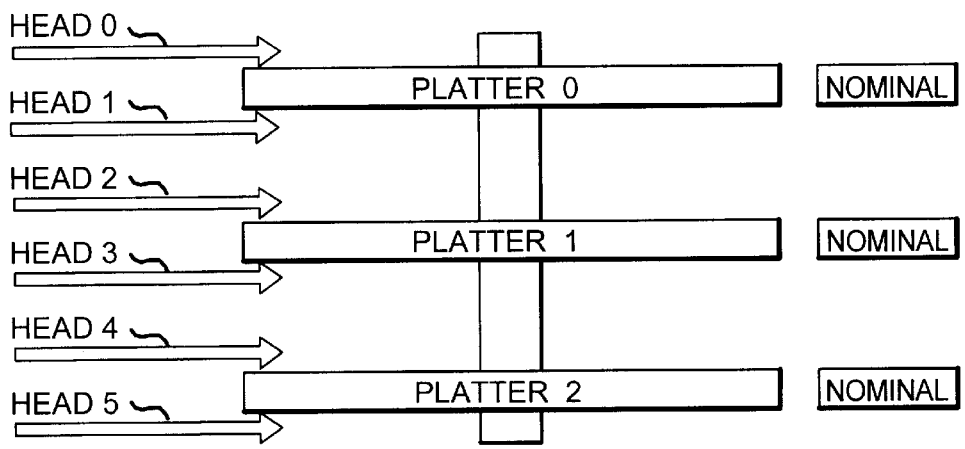
FIGS. 7A–7C illustrate exemplary physdisk configurations in accordance with a preferred embodiment of the present invention.

Considering the sorting done in our particular example above of FIG. 6B, we would classify the heads into two groups, good and bad, according to their quality measured by the total error rate. Under this particular VBPI physdisc table scheme, the bad group contains two heads (HD0 and HD1) while the good group has four heads (HD2, HD4, HD3, HD5). The results of using the first physdisc table, N0P0, are shown in FIG. 7A, where all heads are operated at nominal data recording rates. The results of using physdisc table N2P1 results in the configuration of FIG. 7B; the results of using physdisc table N4P2 results in the recording at the rates shown in FIG. 7C.

Two further adjustments are available even after this first analysis is completed and the appropriate physdisc table is selected. The table having been selected, caution must be taken to prevent the case where the bad heads pass, having been given appropriate compensation, but now good heads fail from being over stressed by being assigned too high a data rate.

Hence a set of tolerance numbers are developed for checking against the limit of the KBPI rate that a normally good head can take. For the example of FIG. 8, which is an example where the above three physdisc tables are provided, the default rate where no adjustments are made to the recording rate is assigned to the region from 0 to $\alpha\%$; the intermediate case is assigned the range from a $\alpha\%$ to $\beta\%$, and the region from $\beta\%$ to 100% is assigned to the case where the greatest change in margins occurs. The percentage is based on a fraction which is determined by the total error rate for the worst head from the bad head group, minus the total error rate from the worst head in the good head group, divided by the total number of sectors tested. Then the default case 800 is assigned where the percentage difference is between 0 and $\alpha\%$; the intermediate case 802 is assigned where the difference in percentage is between a $\alpha\%$ and $\beta\%$; and the segment for maximum adjustment in the recording rates is assigned for the condition where the difference in error rates 804 is between $\beta\%$ and 100%. In the example we have been processing, which are based on the head test of FIG. 6, head 1 and head 5 are the two worst cases from their respective groups, i.e., the bad head group and the good head group. The way the heads are operating after reassignment according to the N4P2 physdisc, it may be shown that the error rate for the weakest head of the bad group has been reduced to an acceptable level, while the error rate of all heads in the good head group has been kept at an acceptable level. Therefore, the drive is now a viable drive.

Figure 7B:
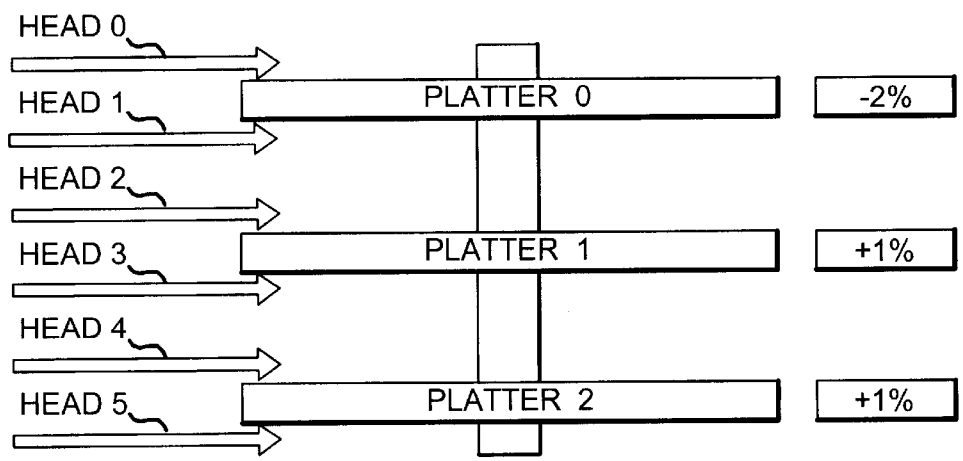
Figure 7C:
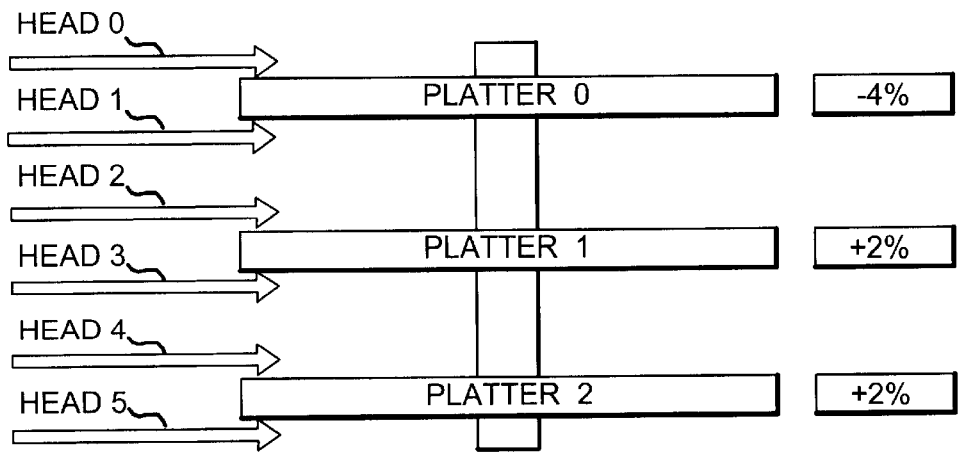

In an actual hard disc drive, the recording bit densities may not be distributed as shown in FIGS. 7A–7C. A head map table 154 is used to map each logical head to one appropriate physical head. Each logical head is associated with a prescribed storage capacity which is based on the recording frequency and hence recording bit density of the corresponding physical head. In the nominal case, the mapping of a logical head to a physical head does not consider the recording frequency or recording bit density of a particular physical head. This is because there is a uniform recording frequency associated with each head and for each zone in each disc surface. However, it is also possible that each physical head can be associated with a different recording frequency and hence recording bit density. As such, the head map table is used to map each logical head to a corresponding physical head that is capable of accommodating the storage capacity associated with the respective logical head.

Figure 9:
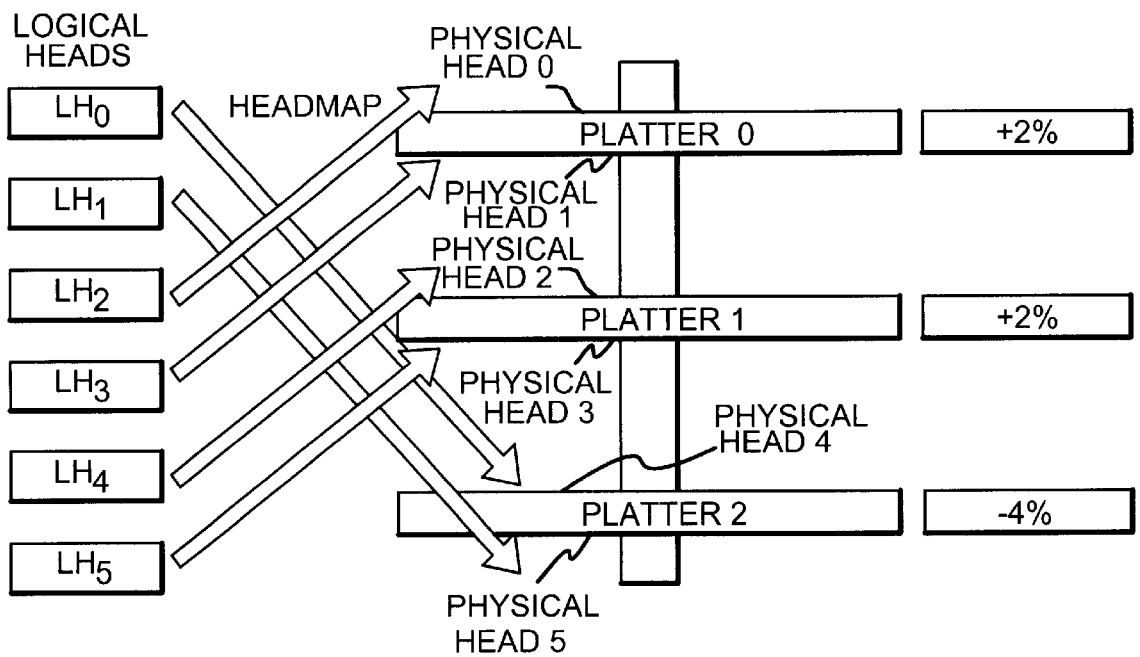
FIGS. 9 and 10 illustrate exemplary logical head to physical head mappings in accordance with a preferred embodiment of the present invention.
Figure 10:
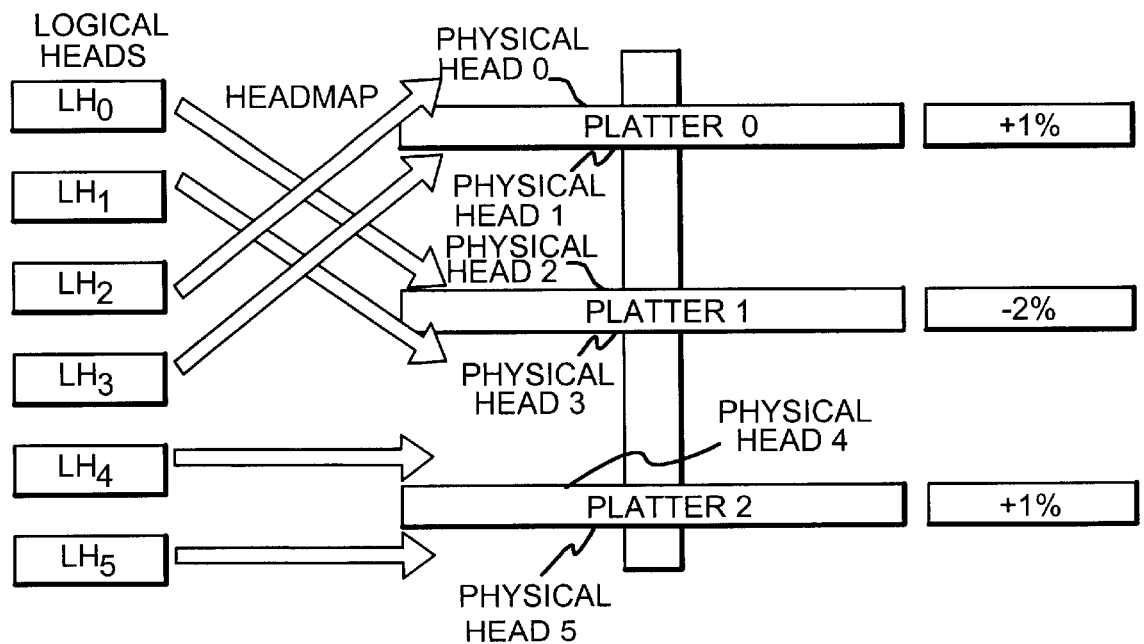

FIGS. 9 and 10 illustrate the mapping of the logical heads to corresponding physical read/write heads. Referring to FIG. 9, there is shown six physical read/write heads, labeled Physical Head 0–Physical Head 5, and six logical heads, labeled $LH_0$–$LH_5$. Each logical head has a prescribed storage capacity and is mapped to a respective physical head that can accommodate the storage capacity. For example, logical head $LH_0$ is mapped to physical head 4 whose recording bit density has been reduced by 4% of a nominal recording bit density, logical head $LH_1$ is mapped to physical head 5 whose recording bit density has been reduced by 4% of a nominal recording bit density, logical head $LH_2$ is mapped to physical head 0 whose recording bit density has been increased by 2% of a nominal recording bit density, logical head $LH_3$ is mapped to a physical head 1 whose recording bit density has been increased by 2% of a nominal recording bit density, logical head $LH_4$ is mapped to physical head 2 whose recording bit density has been increased by 2% of a nominal recording bit density, and logical head $LH_5$ is mapped to physical head 3 whose recording bit density has been increased by 2% of a nominal recording bit density. It should be noted that there can be multiple logical heads mapped to a particular physical head.

FIG. 10 shows six physical heads, labeled Physical Head 0–Physical Head 5, and six logical heads, labeled $LH_0$–$LH_5$. Each logical head has a prescribed storage capacity and is mapped to a respective physical head that can accommodate the storage capacity. For example, logical head $LH_0$ is mapped to physical head 2 whose recording bit density has been reduced by 2% of a nominal recording bit density, logical head $LH_1$ is mapped to physical head 3 whose recording bit density has been reduced by 2% of a nominal recording bit density, logical head $LH_2$ is mapped to physical head 0 whose recording bit density has been increased by 1% of a nominal recording bit density, logical head $LH_3$ is mapped to physical head 1 whose recording bit density has been increased by 1% of a nominal recording bit density, logical head $LH_4$ is mapped to physical head 4 whose recording bit density has been increased by 1% of a nominal recording bit density, and logical head $LH_5$ is mapped to physical head 5 whose recording bit density has been increased by 1% of a nominal recording bit density.

The steps used to assemble a disc drive utilizing the technology of the present invention will now be considered in further detail. In constructing a disc drive, the head/disc assembly is constructed. The head/disc assembly is shown in FIG. 4 as including the actuator 126, the arm 128, the head 130, the disc 122, and the spin motor 124. The servo information is written in the tracks on the discs using a servo track writer of the type well known to those skilled in the art. In addition, the zone boundaries are generated for each head-disc combination based on an expected head, disc, and channel capability and remain static on each recording surface in the disc drive.

Next, the head/disc assembly is tested. The VBPI tuning procedure 152 performs the test. In particular, the head performance of the assembly is tested which is defined in the art on the basis of head performance at a given recording frequency, $f_R$, in terms of the bit per inch (BPI) error rate. The BPI error rate is defined as the number of bits transferred per bit in error when data is read at a predetermined location. The drive designer defines a minimum BPI error rate threshold that each head needs to adhere to. If a particular head does not meet the BPI error rate threshold, then the head is deemed to have failed the test. A failed head is then subject to variable bit per inch (VBPI) tuning in order to determine if the drive can be configured to compensate for the lost storage capacity.

The VBPI tuning procedure determines the BPI error rate for each head (step 202). FIG. 6A illustrates the steps used to measure the BPI error rate for each head. These steps are performed by the VBPI tuning procedure 152. First, a particular zone is selected for the test (step 212). Next, each recording head is tested (step 214) using a number of different data rates otherwise referred to as Kilo Bits Per Inch (KBPI) test points (step 216). For each KBPI test point, test data is written onto the disc surface at the selected zone and read back from the written location (step 218). The test data is then checked for the presence of any errors and the KBPI error rate for the corresponding KBPI test point is updated accordingly. The KBPI error rate for a particular test point i is calculated in accordance with the following mathematical relation:

$$\text{Error}_{KBPI(i)} = \text{number of erroneous sectors/total number of sectors.}$$

FIG. 6B is a graph illustrating the KBPI error rates at the various test points for the various read/write heads for a particular zone. The KBPI test points are on the x-axis and the error rates are on the y-axis. There are six curves, one for each read/write head.

Once the KBPI error rate has been determined for each test point I-1, . . . n, the total error rate for the head, $\text{Error}_{HD}$, is calculated as the sum of all the KBPI error rates for each test point (step 220). This can be represented by the following mathematical relation:

$$\text{Error}_{HD} = \sum_{i=1}^{n} \text{Error}_{KBPI(i)}$$

The VBPI tuning procedure 152 then sorts the BPI error rates for each head, $\text{Error}_{HD}$, in ascending order (step 204). For example, for the disc drive shown in FIG. 1 that has six heads, the sorted order can be as follows:

$$\text{Error}_{HD2} < \text{Error}_{HD4} < \text{Error}_{HD3} < \text{Error}_{HD5} < \text{Error}_{HD0} < \text{Error}_{HD1}$$

In this example, the second head, HD2, has the lowest error rate and the first head, HD1, has the highest error rate. Heads 1 and 0 ($HD_1$, $HD_0$), are the weakest heads when compared with the other heads since they have the highest error rate.

The task then becomes one of tuning the disc drive by assigning a predetermined VBPI physdisc to the drive so that the disc drive can pass the BPI error rate threshold (step 206). Once the appropriate VBPI physdisc configuration is determined, which will be explained below, the physdisc table is updated to reflect the recording frequency associated with each head in a particular zone. The information in the physdisc is then used in accessing the information stored on each disc surface.

The VBPI tuning procedure 152 then groups each of the read/write heads into two groups. A first group is considered the good group and the second group is considered the bad group. The first group includes the four read/write heads having the lowest BPI error rates and the second group includes the two read/write heads having the highest BPI error rates. In the above examples, the first group includes Heads 2–5, and the second group includes Heads 0–1.

The assignment of the appropriate VBPI physdisc configuration is made based on the percentage difference between the error rate of the worst head in the second or bad group (i.e., head with highest error rate) and the error rate of the worst head in the first or good group. The percent difference is used to determine the appropriate VBPI physdisc. The percent difference is represented by the following mathematical relation:

$$\% \text{ Difference} = [(\text{Error}_{HD \text{ worst in group } 1} - \text{Error}_{HD \text{ worst in group } 2})/\#\text{of sectors tested}] \times 100\%.$$

Figure 8:
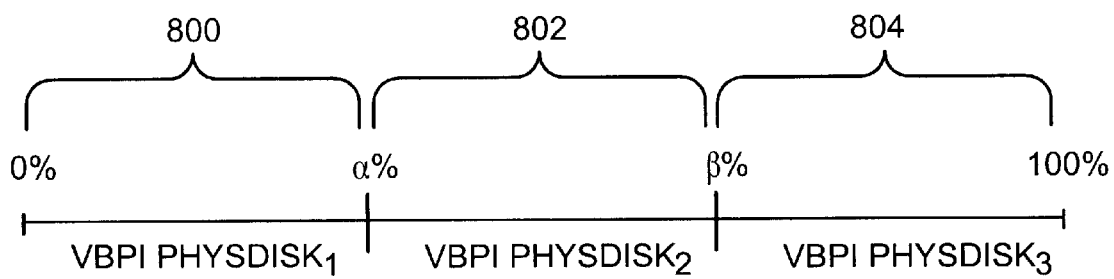
FIG. 8 illustrates the thresholds used to define the ranges for each of the VBPI physdiscs in accordance with a preferred embodiment of the present invention.

Referring to FIG. 8, there is shown the three ranges: (1) the first range is between $0\%–\alpha\%$ and defines the range for the nominal VBPI physdisc configuration, see FIG. 7A; (2) the second range is between $\alpha\%–\beta\%$ and defines the range for the second VBPI physdisc configuration, see FIG. 7B; and (3) the third range is between $\beta\%–100\%$ and defines the range for the third VBPI physdisc configuration, see FIG. 7C.

The VBPI tuning procedure 152 matches the percentage difference to the corresponding range to determine the appropriate VBPI physdisc for the disc drive. Thus, the first VBPI physdisc is selected if the percentage difference is less than $\alpha\%–\beta\%$, and the third VBPI physdisc is selected if the percentage difference is greater than $\alpha\%$.

The VBPI tuning procedure 152 then configures the recording bit density for each of the read/write heads in accordance with the selected VBPI physdisc configuration. Each of the read/write heads in the good group are increased by the increased BPI percentage in the VBPI physdisc and each of the read/write heads in the bad group are decremented by the decreased BPI percentage in the VBPI physdisc. The VBPI tuning procedure 152 sets the recording frequency for each read/write head for the tested recording zone based on the modified BPI percentage (step 207).

It should be noted that steps 202–207 are used to determine the recording frequency for one particular recording zone. These steps are repeated for each additional recording zone.

Next, the logical heads are mapped into the appropriate physical heads (step 208). As noted above, there can be many logical heads for a particular physical head. The mapping of the logical heads to the physical heads is then stored in the head map table 154. The head/disc assembly is then retested (step 210). When the disc drive successful completes the test, the disc drive is used to record and retrieve data (step 211).

The embodiment described above is particularly useful when only a few predefined physdisc tables are implemented. In such a case, upon testing of the various heads for a particular disc drive, one of the existing or predefined physdisc tables is selected and assigned for the disc drive as discussed above with respect to FIG. 8. Since the physdiscs are predefined and existing, they are either in memory of the disc drive, i.e., hard-coded in software or hard-wired, using circuit hardware components to implement the tables electronically. Hard-coding or hardwiring preset physdisc tables is beneficial in that calculations related to frequencies and sector allocations are predefined and do not have to be recalculated during test phase or when using the disc drive. Moreover, calculations with respect to sector location on the discs are predetermined and little to no computations are necessary to locate data.

Employing the head mapping algorithm described above, i.e., using logical heads to map to physical heads increases the flexibility with respect to each physdisc table and the number of available combinations for a particular disc drive. However, since the physdisc tables are predefined and existing prior to the testing of the disc drive, there is a limit as to the number of possible combinations that can be used even when taking the head-mapping algorithm into account. Unfortunately, depending on the disc drive, other combinations that are not available in the preset physdisc embodiment may, in fact, be desirable.

Figure 11:
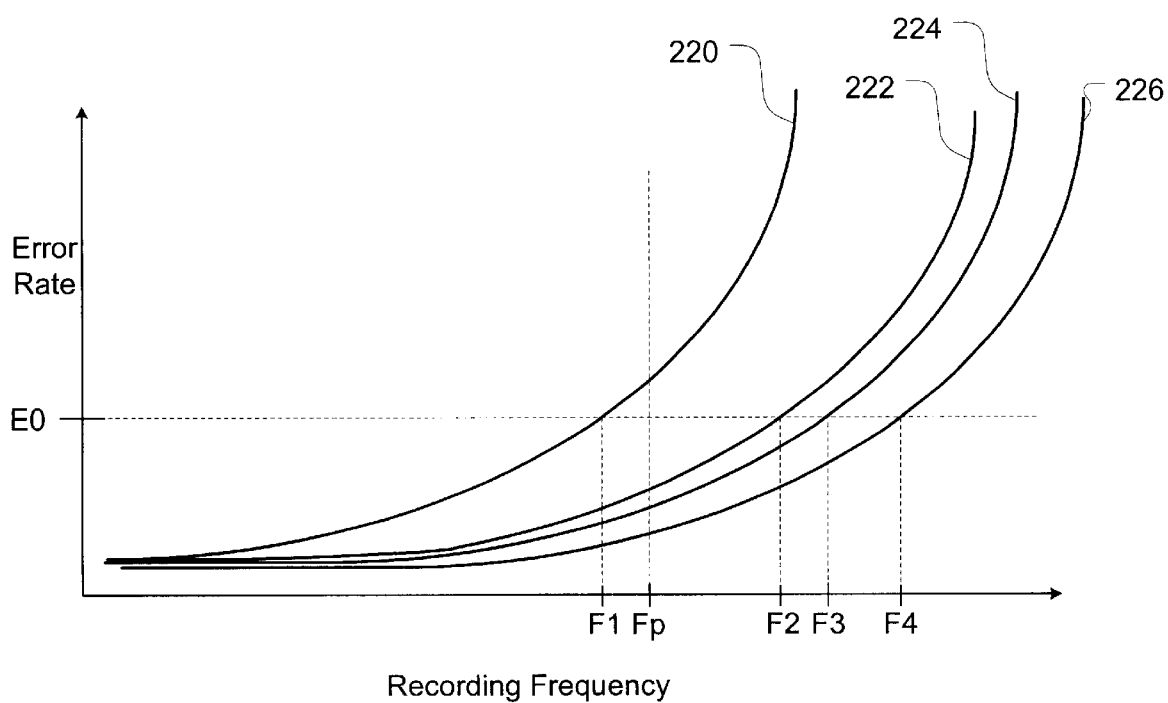
FIG. 11 is graph of a simplified set of error characteristic curves for four heads.

For purposes of illustration, a simplified set of zone-specific error characteristic curves for a disc drive having at least four heads is shown in FIG. 11. This hypothetical set of error characteristic curves is used herein to illustrate possible variations with respect to error characteristic criteria and recording frequencies in accordance with the desired storage capacity for the disc drive. FIG. 11 illustrates the circumstance where some heads are able to record data at a higher rate or frequency than other heads while still satisfying minimum error rate criteria. Each head is tested, as described above, resulting in an error rate characteristic curve as illustrated in FIG. 11. As the recording frequency for each head increases, the error rate associated with that head also increases. Typically a predetermined maximum error rate, labeled as E0 in FIG. 11, exists for each disc drive and relates to the maximum acceptable error rate for each head. In other words, the "maximum frequency" at which each head can record is related to the highest frequency the head may record data and still produce the same or fewer errors than that defined by error rate E0.

Curve 220 is an exemplary curve representing error characteristics of one of the heads of the disc drive depicted in FIG. 2. The curve 220 represents the number of errors caused in reading or writing data to or from its respective magnetic disc as the recording frequency increased during the testing phase. The maximum frequency F1 represents the highest frequency at which the head associated with curve 220 can operate while maintaining satisfactory error levels. That is, F1 represents the maximum frequency at which the particular head can record and retrieve data from its particular disc while satisfying the error rate requirements, i.e., the requirements represented by E0.

Similarly, each of the curves 222, 224 and 226 also represent an error rate characteristic curves for one of the remaining three heads in the disc drive. As shown in FIG. 11, the head associated with curve 222 has a maximum recording frequency of F2, the head associated with curve 224 has a maximum recording frequency of F3 and the head associated with curve 226 has a maximum recording frequency of F4. From this illustration one can see that if E0 changes, the maximum recording frequency for each head also changes.

A predefined frequency Fp is also shown in FIG. 11. The frequency Fp is related to the preferred frequency at which all heads are set to record data onto their respective discs in a particular zone to achieve a predetermined amount of data storage or capacity in that zone. A specific Fp is predetermined for each zone of the separate discs in attempting to achieve desired storage capacity for the disc drive. That is, for a particular zone on a particular disc surface, a preferable, predetermined amount of data can be stored in the zone and to accomplish this, each head preferably records at the frequency Fp. More importantly the heads must not record at a frequency below Fp, unless one of the other heads compensates by recording at a recording frequency that is correspondingly higher than Fp. Thus, as long as the average frequency of the various recording frequencies used by all the heads is Fp, then the desired storage capacity is achieved.

Therefore, if a particular error characteristic curve reveals that the maximum frequency associated with a particular head is less than Fp, the head is considered deficient and cannot record the predetermined amount of data without exceeding maximum error rate criteria. In such a situation, another head must compensate for the deficient head by operating at frequency higher than Fp.

However, and as is often the case, any one of the remaining heads can potentially record at a compensating frequency to overcome the deficiencies of the deficient head, e.g., the head associated with curve 200 shown in FIG. 11. Additionally, the example depicted in FIG. 11 illustrates that there may be many combinations associated with these heads to achieve an optimized assignment of recording frequencies. For example, any of the three other heads can be operated at a higher frequency to compensate for the deficient head. Additionally, the recording frequency associated with curve 220 may be operated at a rate lower than F1 in order to bring its associated error rate lower. In order to do so, possibly two of the other three heads may be used to compensate for the even lower recording frequency yet still maintaining a relatively low average error rate. Also, one head may be better suited than another to compensate for a deficient head. As an example, one head may have a lower error rate at the compensating frequency than another head.

Error characteristics for each head are relatively independent from the error characteristics of the remaining heads and therefore the set of error characteristic curves, as represented in FIG. 11 for a particular disc drive, is most likely different for each manufactured disc drive. It is easy to see that many combinations are possible, and many more may be considered optimal than may be available if the physdisc tables are preset or predefined.

Therefore, in another embodiment of the present invention, the physdisc table which controls the recording frequencies for the various heads is dynamically generated or determined after the heads are tested and stored in memory which is accessed by the microprocessor 111 (FIG. 2) when needed. Accordingly, in this embodiment there are no preset or predefined physdisc tables and all calculations related to addresses and sector allocation is determined following the testing of the disc drive heads. Similarly, the conversions of Logical Block Addresses (LBAs) to Physical Block Addresses (PBAs) are done when needed, using the dynamically created physdisc table.

Figure 12:
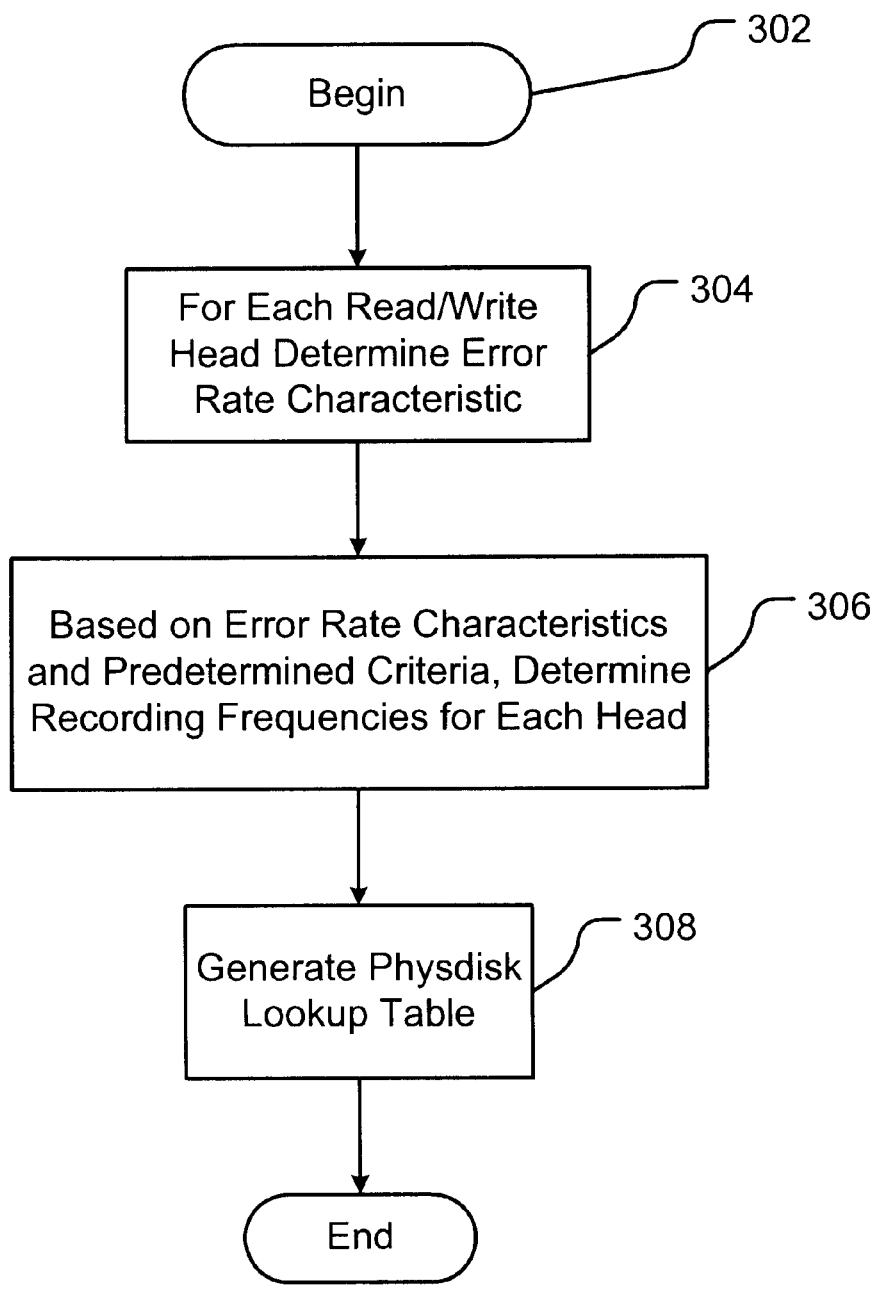
FIG. 12 is a flow chart illustrating the functional operations executed in achieving an alternative embodiment of the present invention wherein a physdisk is created following error testing.

The overall operational functions of this alternative embodiment and specifically the test and sector allocation phases of this embodiment are illustrated in FIG. 12. The process begins at 302 with a disc drive that has been substantially manufactured and is fairly complete from a hardware standpoint. The disc drive has not been tested at this point but the various disc platters and read/write heads are preferably in place.

Test operation 304 tests the manufactured disc drive to determine the error rate characteristic, this testing process is as described above with respect to FIG. 6A. The error rate characteristic test is done for each head and for each zone.

Each head is tested separately to determine maximum recording frequencies at which data can be recorded and retrieved from the corresponding discs while maintaining error rate requirements. Test operation 304 essentially involves a loop wherein data is recorded and read back at a particular frequency. The error rate is calculated for that particular frequency and the calculated error rate is compared against the maximum error rate criteria. Preferably, a theoretical maximum recording frequency, based on the designed maximum bit density for a disc, is used as the starting frequency in the test procedure. Following the comparison, the recording frequency is decreased and the head is tested again. The head is systematically tested with incrementally lowered test frequencies until the error rate requirements are met and meaningful error rate characteristic information related to the head is obtained. Alternatively, the test recording frequency starts low and is increased an incremental amount during each testing.

Following the testing of each head for the particular disc, analyze operation 306 compares the error rate characteristic data for each head and determines an acceptable combination of recording frequencies for all the heads of the disc drive. In essence, each head is assigned a recording frequency that is equal to or below its maximum recording frequency. However, the combination of recording frequencies results in an average recording frequency approximately equal to Fp (FIG. 11) to achieve desired storage capacity while keeping the average error rate as low as possible. Moreover the acceptable combination is based primarily on recording frequency capabilities and not on whether a predefined combination exists that can be used. Instead, the frequencies are combined to determine the combination.

The recording frequencies may be represented as a percentage in relation to the desired frequency Fp. That is, each head is assumed to operate at the desired frequency Fp and any variation from Fp may be represented as percentage variation from Fp. Therefore, a head operating at Fp, may be represented as operating at 0% or at the nominal frequency. Each variation from this nominal frequency is represented by a plus or minus percentage difference. As an example, the following table illustrates various frequencies and the resulting sectors per track in the various zones.

| Frequency | Zone 0 (Sectors per track) | Zone 1 (Sectors per Track) |
|---|---|---|
| Maximum Frequency | 360 | 350 |
| Fp + 5% | 342 | 313 |
| Fp | 325 | 298 |
| Fp − 5% | 309 | 283 |

The above percentage representation is based on the number of sectors per track and since all data is stored in terms of sectors, partial sectors cannot be used. Currently, a sector contains approximately 512 data bits. The above table is only a partial listing of various percentages and how they relate to the nominal frequency Fp. The table can be extended in either direction, listing various possibilities for the various heads. Additionally, the table may contain only one zone of information or may contain more than the two zones shown. A predetermined lookup table having these values is used in generating the desired combination to ensure that partial sectors are not created. Preferably the table includes very small increments (on the order of 1%) to increase the flexibility and number of possible combinations available for the various disc drives.

Once the desired combination of recording frequencies for the heads has been determined, generate physdisc 308 creates a physdisc lookup table incorporating relevant values. The physdisc table is stored, in the memory accessed by the microprocessor 111 shown in FIG. 2. The microprocessor 111, in operation, accesses the physdisc to control the various heads within the disc drive. Once the data has been stored, the testing and allocating process is complete.

Figure 13:
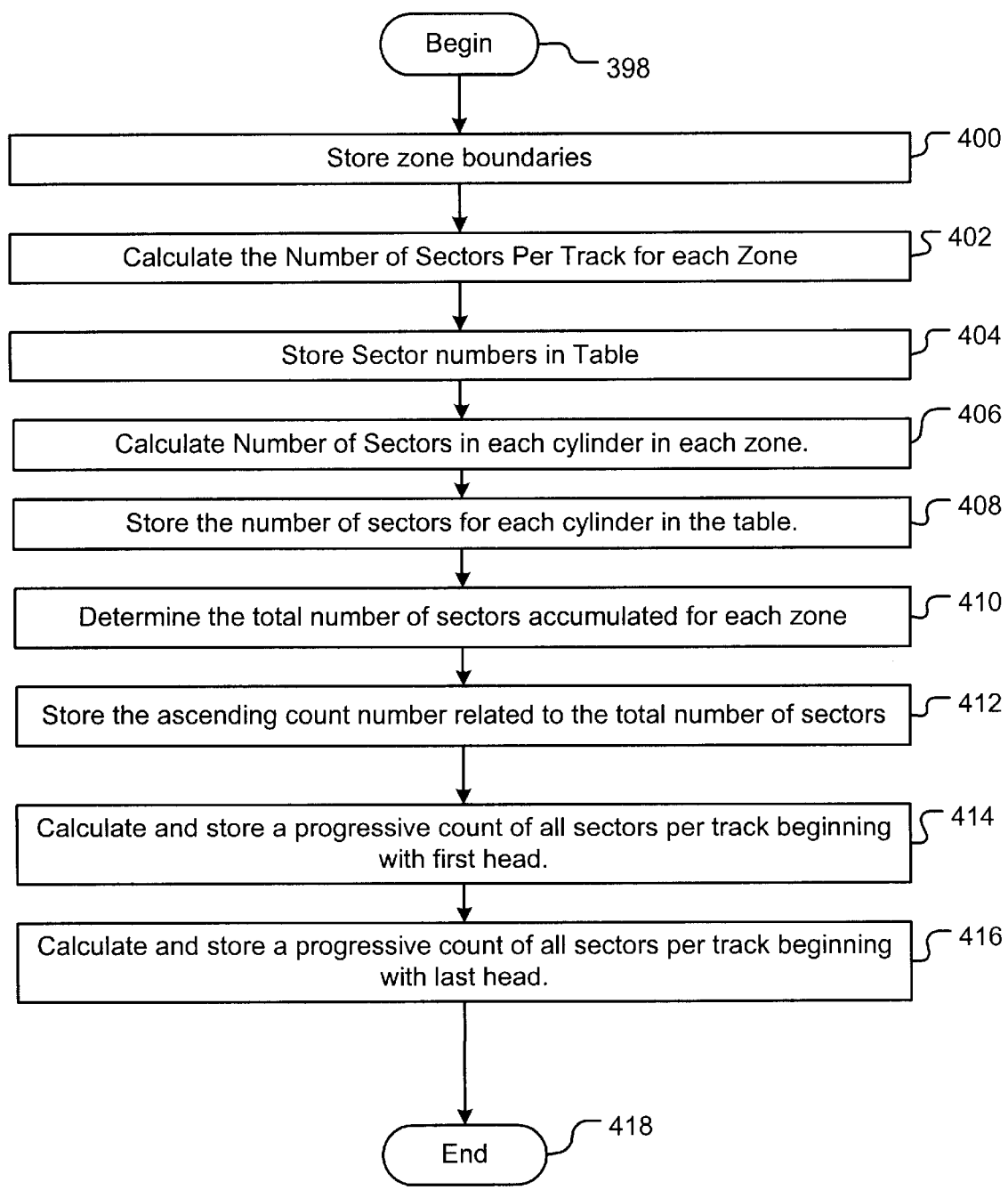
FIG. 13 is a flow chart illustrating functional operations in creating the physdisk table.
Figure 14:
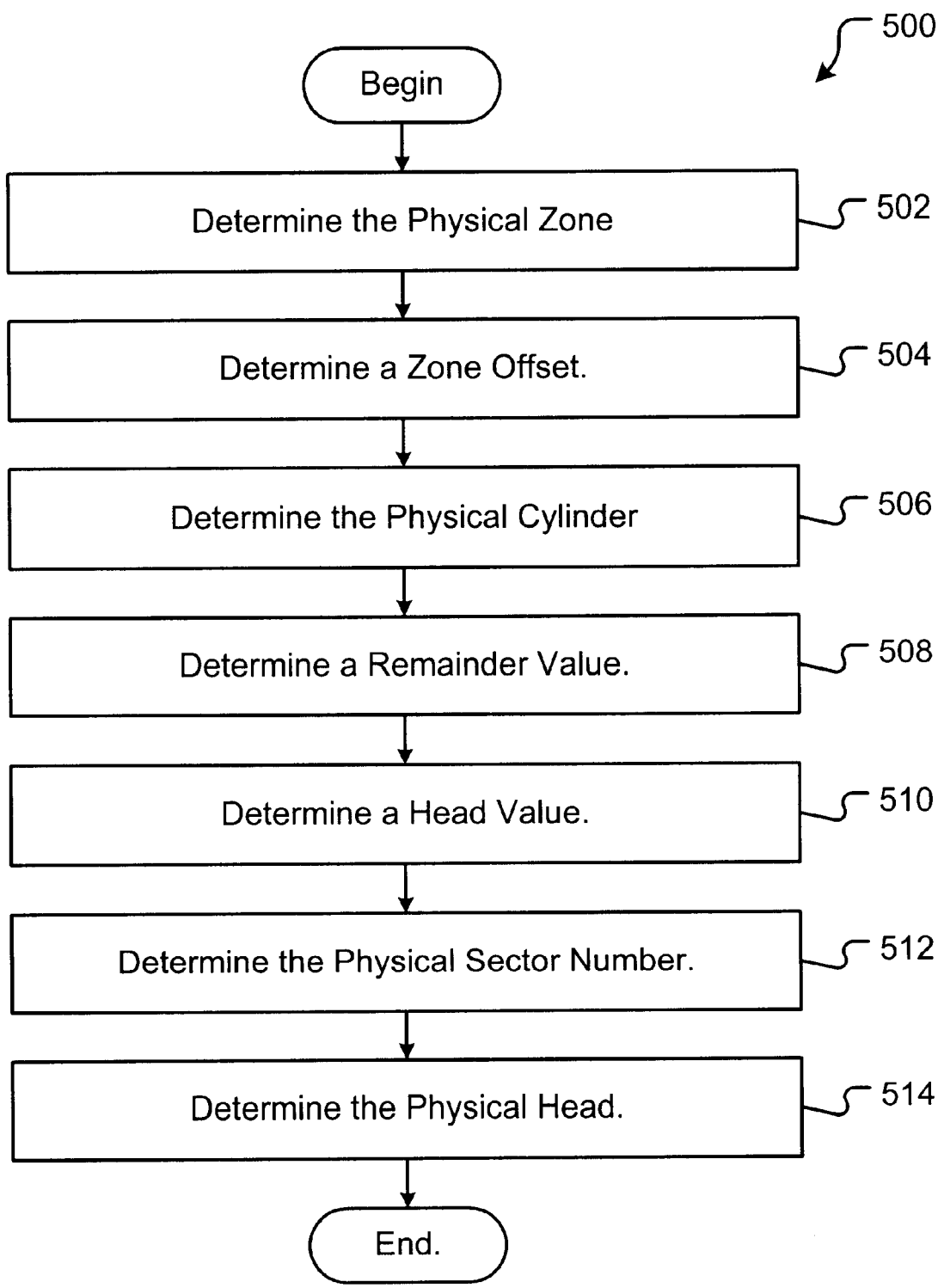
FIG. 14 is a flow chart illustrating the functional operations in converting from a logical block address to a physical block address using the physdisk table.

The operational functions related to the generation of the physdisc lookup table (operation 308 FIG. 12) are depicted in FIG. 13. In a preferred embodiment of the physdisc, these functions are preferably performed by the microprocessor in executing a software routine. Initially, store zone boundaries operation 400 stores the zone boundaries in the physdisc table, i.e. "physdisc." The zone boundaries are defined during the design stage and do not change because the calculation of the sectors per track for different recording bit densities on each head of each zone is based on this assumption. The cylinders of the disc drive are also predefined, and thus the allocation of zone boundaries typically only requires a determination of which cylinders are in which zone. The zone boundary information in the physdisc relates to this determination and lists all cylinders, by number, located in each zone. Alternatively, only the lower (or higher) zone boundary, that is the lowest (or highest) numbered cylinder for each zone is listed.

Following the storing of zone boundary information, calculate operation 402 calculates the number of sectors per track for each zone. Calculate operation 402 uses both a theoretical number related to the maximum number of sectors supported by each zone, which is predefined during the design stage, and the results from the head testing procedure 306, FIG. 12. Once the recording frequencies have been determined during the test phase using a preferred table of sectors per track for each frequency, these values can be determined. Therefore, the calculated number relates to the number of sectors a particular head records in each of the tracks within a particular zone. Following the calculation of sector numbers per track, store operation 404 stores the results in the physdisc, such as in a column labeled "Number of Sectors Per Track."

Next, calculate operation 406 determines the total sectors per cylinder in a zone. Operation 406 simply adds the sectors of all the tracks on one cylinder, i.e., the value results from operation 402 for each head within each zone. Step 408 stores the results of operation 406 in the physdisc in a "Total Sectors per Cylinder" column.

Operation 410 then determines the total number of sectors accumulated per zone by multiplying a number value representing the number of cylinders in a particular zone, which is based on the result of operation 400, by the number value representing the total number of sectors per cylinder in the zone, which is the result of operation 406. Operation 410 is repeated for each zone.

Next, step 412 calculates and stores a value in the lookup table representing the total number of sectors for a zone plus the total number of sectors of all preceding zones. Step 412 is repeated for each zone, preferably beginning with the outer most zone. Therefore, for the first entry, which relates to the outer zone, the value stored in the physdisc is equal to the number of sectors in the outer zone, as calculated by operation 410 for the outer zone. For the next zone, i.e., an intermediate zone, the operation 412 stores a value equal to the value calculated by operation 410 for that zone plus the value stored for the outer zone. For the next intermediate zone, if one exists, the stored value equals the value calculated by operation 410 for that zone plus the value.,stored for the preceding zone. Each entry keeps an ascending count of the sectors, by zone, starting with the outer zone up to the last or inner zone. The last entry preferably relates to the total number of usable sectors for the entire disc drive.

Following step 412, operation 414 calculates and stores a progressive count of all sector per track beginning with the first head, i.e., head "0," up to the second to last head. The last head is not counted because the resulting value equals the total sectors per cylinder value calculated by operation 406. Operation 412 stores a table entry for each head, and therefor storing the value again is not necessary. Similarly, operation 416 calculates and stores a progressive count of all sectors per track beginning with the last head up to the second head. Again, the first head is not counted because the resulting value equals the total sectors per cylinder value calculated by operation 406.

following calculate and store operation 416, the physdisc lookup table is complete. An exemplary physdisc table is represented in the following table. The disc drive represented by the following physdisc has four heads, and each disc is subdivided into 3 zones. Additionally there are 12 predefined cylinders. The values shown in this table are for illustration purposes only and this table is does not necessarily relate to the previous table.

Additionally, the conversion process must utilize predetermined information related to the numbering scheme used for numbering the sectors of the disc drive. In a preferred embodiment, the sectors are numbered based on cylinders. The cylinder is a combination of respective or corresponding tracks from all discs. In essence, the outermost tracks within the outermost zone associated with each of the different sides of the different discs is referred to as a cylinder. Logical numbering the sectors typically involve sequentially numbering each track beginning at zero for the first track, numbering each sector within that track and then assigning the next sequential number to the first sector in the next track within that same cylinder. (By comparison, "physical" numbering of sectors within each track begins with zero.) Once all tracks within a cylinder have been allocated and numbered then the next cylinder of tracks inward towards the center begins with the next sequential sector number. It is also preferable to begin numbering the next cylinder starting with the same head, i.e., using the same head that ended the previous cylinder in this numbering scheme. In essence the numbering scheme continues in a serpentine manner, in that the first cylinder is numbered starting at the top, working

| Zone | Cylinders | Head | Number of Sectors per Track | Total Sectors Accumulated per Zone Ascending | Total Sectors Per Cylinder | Total Sectors Accumulated per Head Ascending | Total Sectors Accumulated per Head Descending |
|---|---|---|---|---|---|---|---|
| 0 | 0–3 | 0 | 12 | 168 | 42 | 12 | 9 |
|   |     | 1 | 11 |     |    | 23 | 19 |
|   |     | 2 | 10 |     |    | 33 | 30 |
|   |     | 3 | 9  |     |    |    |    |
| 1 | 4–7 | 0 | 8  | 272 | 26 | 8  | 5  |
|   |     | 1 | 7  |     |    | 15 | 11 |
|   |     | 2 | 6  |     |    | 21 | 18 |
|   |     | 3 | 5  |     |    |    |    |
| 2 | 8–11| 0 | 4  | 312 | 10 | 4  | 1  |
|   |     | 1 | 3  |     |    | 7  | 3  |
|   |     | 2 | 2  |     |    | 9  | 6  |
|   |     | 3 | 1  |     |    |    |    |

Once the physdisc table is complete, all sectors have, in essence, been allocated. In order to locate a particular sector on the disc requires a conversion from a logical block address to physical block address. A logical block address is merely an integer value for a sector, where each sector is sequentially numbered beginning with zero. The physical block address has three components: the cylinder number; the head number and the sector number.

The operational functions of achieving the conversion 500 from a logical block address to a physical block address using the dynamically created physdisc table are shown in FIG. 13. The conversion process 500 typically begins with the receipt of a read command, or possibly a write command, conducted by the host computer system which is accessing the disc drive. The command includes an address for the memory sectors desired to be accessed. The conversion process 500 uses the address (which is a logical address) and converts it to a physical address related to the particular sector's physical position on the disc in order to read or write that particular sector. Since each hard drive may contain a separate and unique combination of recording heads the microprocessor within the disc drive must calculate the position of that sector based on the unique combination of recording frequencies used in the disc drive. In order to do so, conversion process 500 uses information from the physdisc lookup table.

down. Once a cylinder is numbered from the top down, then the next inward cylinder is numbered starting at the bottom, working up, and so on.

The purpose of numbering the sectors by cylinder instead of by disc surface is due to the fact that data is recorded or retrieved in blocks, i.e., large numbers of sectors at one time. In order to read a large number of sectors it is advantageous to read a full track and then, without moving the heads, do an electrical switch and begin reading the data on another disc surface using a subsequent head, reading from the same cylinder. Reading data in this manner saves time in seeking for data since the heads do not move as often. The purpose behind the serpentine method involves the concept that when you have to switch cylinders, it is faster to continue reading with the same head than to do both a head move and an electrical switch to another head. Although the sectors in a particular cylinder are numbered sequentially, each track in a particular cylinder may have a different number of sectors. The number of sectors in any track is related to the recording frequency for the head that reads or writes that particular track.

Beginning the conversion process 500, compare operation 502 compares information related to each zone to determine which zone contains the physical sector related to the logical block address. Step 502 compares the logical block address to the sectors allocated in each zone as recorded in the lookup table. In particular, the sequential number totaling the number of sectors present within each zone uniquely relates to the allocation of sectors within each zone. Therefore a straight comparison can be made between the logical block address and the sector numbers generated by operation 410 and stored in table by 412 (FIG. 13) to determine which zone the sector is located.

Once the zone has been determined using the logical block address and the information in the table, calculate step 504 calculates the logical block address offset into the current zone. The offset value is determined by subtracting the logical block address number value from the value within the table related to the number of accumulated sectors, up through the preceding zone, i.e., the zoned immediately prior to the current zone which contains the physical sector. Calculate step 504 subtracts the previous zone sector total number from the logical block address number, resulting in a zone offset value.

Next, cylinder determination operation 506 determines which cylinder of the zone contains the particular sector. Determination operation 506 requires that the lowest cylinder number for the current zone be added to the integer value of the zone offset value (result of operation 504) divided by the value related to the number of sectors per cylinder in the current zone. The value related to the number of sectors per cylinder is readily available from the physdisc table. Determination operation 506 requires that each cylinder within a particular zone have the same number of sectors. However, operation 506 does not require that each track within a cylinder have the same number of sectors.

Once the actual physical cylinder has been determined by operation 506, step 508 calculates a remainder value related to a cylinder offset value by taking the remainder value of the offset divided by the total number of sectors per cylinder in that zone.

Next, operation 510 uses the cylinder offset value from step 508 to determine which track contains the sector. Determining the track is analogous to determining which head used. Calculate operation 510 initially determines whether or not the cylinder number is odd or even because of the serpentine motion of numbering the allocated sectors. If the cylinder is an even number the operation 510 uses the physdisc table column of information related to head values listing sector accumulation in ascending order. If the cylinder is an odd numbered cylinder operation 510 uses the physdisc table column of information related to head values listing sector accumulation in descending order. The remainder value calculated by step 508 is used to compare against these particular table values. Determining which table column value is greater than the remainder value allows a determination as to which physical head is used to store or retrieve the data for the particular sector.

Next, calculation step 512 calculates the actual sector number within the track. If head zero is used the sector number equals the remainder value. Otherwise for even cylinders the sector number equals the remainder value minus the total of sector count ascending order for the preceding head in the same zone, and for odd cylinders it equals the remainder minus the total sector for descending order the preceding head as defined by the zone.

Once the sector value has been determined, operation 514 adjusts the value related to the head if the particular sector is located in an odd-numbered cylinder. Since head number values are numbered from zero to a value related to the total number of heads, for odd cylinders the value used to represent the head must be adjusted. Preferably this process involves simply subtracting the existing value for the head from the total number of heads minus one. This step simplifies the process of getting sector information from the physdisc table.

Once the conversion process 500 is complete, the read step may be executed.

Figure 15:
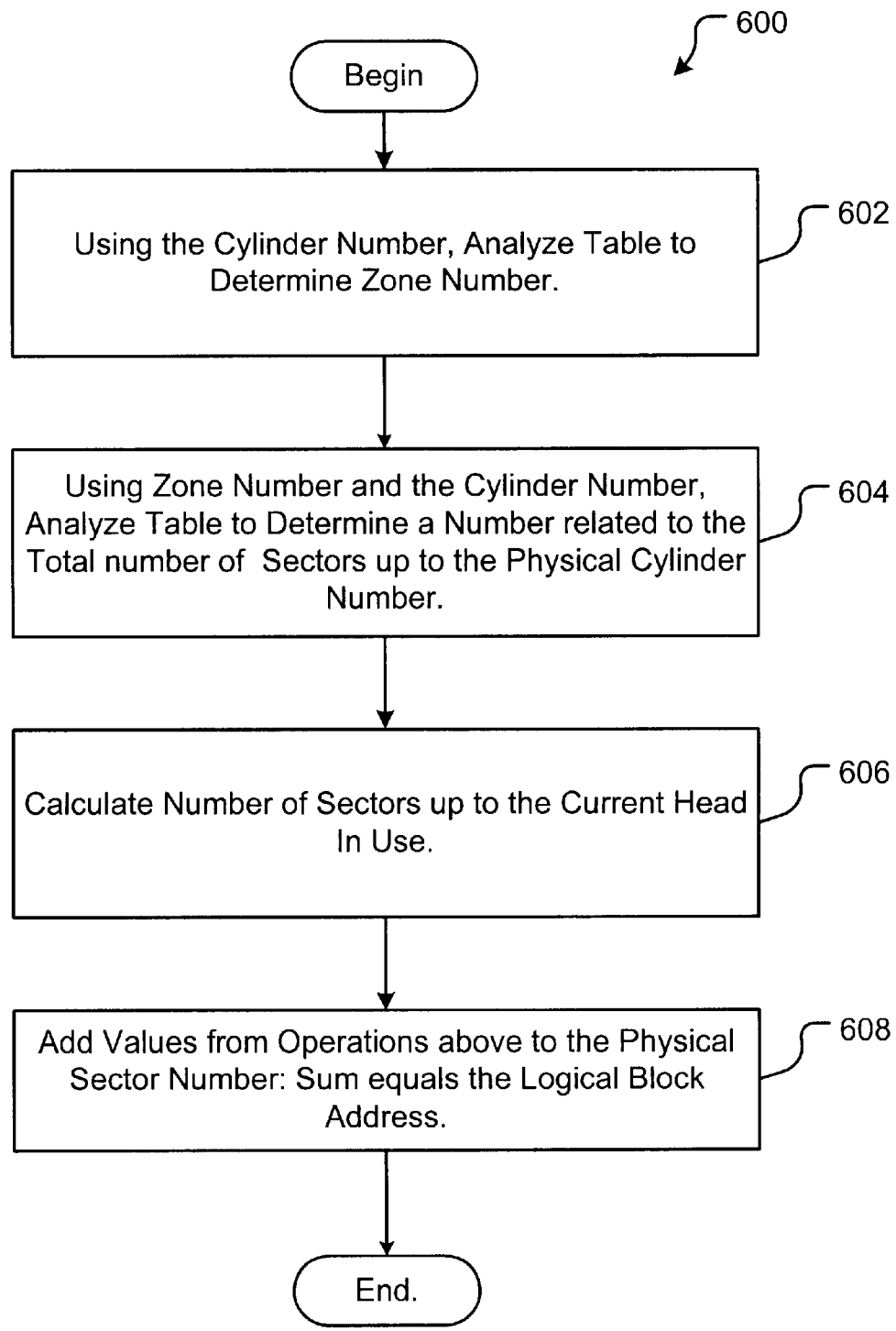
FIG. 15 is a flow chart illustrating the functional operations in converting from a physical block address to a logical block address using the physdisk table.

The functional operations related to conversion process 600 for converting a physical cylinder-head-sector address related to a particular, physical sector to a logical block address, which can be to be used by the microprocessor are shown in FIG. 15. The first step 602 involves determining which zone the particular sector is located. In general, the zone can be determined relatively directly from the cylinder number portion of the physical address. The physdisc table includes zone values and corresponding cylinder values such that determining the zone value from the cylinder value is a straight forward process of comparing the given cylinder value against the table cylinder values. Once a match is made, the zone related to the cylinder has been determined. More importantly, once the zone has been determined, the total number of sectors for all previous zones is known from the "Total Sectors Accumulated per Zone Ascending" column of the table. Therefore, if the sector is in zone 2, for example, the total number of sectors up to zone 2 is 272, as per the above table.

Next, calculate step 604 calculates a value related to the number of sectors present up is to the cylinder containing the physical sector. Since the cylinder value is known, step 604 subtracts the lower zone boundary value (for the current zone) from the cylinder number and multiplies the result by the value located in the "Total Sectors Per Cylinder" column related to the present zone. The result of the multiplication is then added to the result from step 602 resulting in a temporary total sector value.

Step 606 then calculates the total sectors up to the current head in use. If the cylinder value is even, and the head is not zero, then the value "1" is subtracted from the head value to get the preceding head number. The total sectors up to and including the preceding head is then selected from the column "Total Sectors Accumulated per Head Ascending" using the preceding head value. Of course, this selection is within the row related to the zone containing the particular sector.

If the cylinder value is odd and does not equal the value related to the last head, then the head value is subtracted from a value equal to the total number of heads minus two. The result of the subtraction is the head value used to select a value from the table column "Total Sectors Accumulated Per Head Descending" in the proper zone row.

The value selected from either the "Total Sectors Accumulated Per Head Ascending" column or the "Total Sectors Accumulated Per Head Descending" column is then added to the temporary total sectors value, i.e., the result of step 604, which results in a new temporary total sectors value.

Addition step 608 completes the process by adding the sector value of the physical address to the total sectors value, i.e., the result of step 606. The sum of these two values is a logical block address that is used by the microprocessor to identify the physical sector.

As an example, using the table above, if the physical sector has a physical address cylinder "9," head "2," sector "3," then the logical block address is calculated as follows. Using the cylinder value "9," the zone value "2" is determined at step 602. Additionally, a temporary total sectors value is set to "272." The value "272" is selected from the table at step 602 using the column "Total Sectors Accumulated per Zone Ascending" and the previous zone value, e.g., "1".

Next, subtract operation 604 subtracts the lower zone boundary value "8" from the cylinder value "9. " The result, "1," is multiplied by the value in the "Total Sectors Per Cylinder" column, e.g. "10." The result is added to the total sectors value from step 602 resulting in a new temporary total sectors value, e.g., "282."

Next, since the cylinder value is odd, calculate step 606 subtracts the head value "2" from the total number of heads minus two. Since there are four heads in this example then "2" is subtracted from "2" and results in zero. The "Total Sectors Accumulated Per Head Descending" column value for head zero is "1" for zone "2. " The value "1" is then added to the temporary sectors value from step 604, resulting in a new temporary total sectors value, e.g., "283."

Last, step 806 adds the sector value "3" to the total sectors value from step 606, resulting in a new value, e.g., "286." The result of addition step 608 is the logical block address for the particular sector as defined by the above table.

The speed of microprocessor 111 (FIG. 2) preferably allows the combinations of recording frequencies to be dynamically implemented in software without significant losses in time in comparison to hard coding the physdisc tables. The ability to control these recording frequencies using software in this manner significantly increases the number of available combinations for a particular head. As an example, the number of unique physdisc tables that can be generated using this method is equal to the number of available bit densities raised to the power of a value relates to the number of heads in the disc drive. Additionally, the head mapping algorithm is not necessary to implement these many and varied combinations. Furthermore, it may be possible to re-design or re-configure the physdisc table at a later time if the performance of one of the heads deteriorates over time.

In summary, the preferred embodiment exemplary of the invention and disclosed herein is directed to an apparatus (such as 120) for recording computer readable information. The apparatus has recording surfaces (such as 104) for storing the information and heads (such as 107) wherein each surface has one associated head for recording data to the recording surface. At least one head operates at an actual recording frequency less than the actual recording frequency of one of the other heads. Additionally, the apparatus includes a dynamically generated physdisc lookup table stored in memory comprising information related to the different heads and the different recording frequencies and a microprocessor (such as 111) for controlling the allocation of data using the dynamically generated physdisc lookup table.

In another preferred embodiment, each head and recording surface relates to a predetermined preferred recording frequency and the average value of the actual recording frequencies for the heads is not less than the predetermined preferred recording frequency.

In another preferred embodiment, the physdisc table is generated following error testing of the heads. The physdisc table comprises information used for converting between logical block addresses and physical block addresses.

In yet another preferred embodiment, the apparatus comprises a plurality of computer readable discs (such as 104), each disc having two sides wherein one side of each disc comprises one of the recording surfaces. Each other side of each disc may also comprise one of the recording surfaces:

In another preferred embodiment, the apparatus each recording surface comprises a plurality of recording zones (such as Z1 and Z2) and the recording frequency associated with each zone differs from the recording frequency associated the other zones. The physdisc lookup table comprises zone boundary information related to cylinder values in each zone, total sectors accumulated per zone information related to a total number sectors within each zone and previous zones, sectors per track information related to a total number of sectors in each track, sectors per cylinder information related to a total number of sectors in each cylinder, and total sectors accumulated per head information related to a total number of sectors within each track and previous tracks.

In another preferred embodiment, exemplary of the invention and disclosed herein is directed to a disc drive (such as 120) capable of storing computer readable data on surfaces of disc media (such as 104) having a plurality of disc media surfaces (104) and a plurality of recording heads (107) for storing computer readable data on the disc media surfaces at variable recording frequencies. The disc drive also comprises a microprocessor electrically connected to the heads wherein the microprocessor controls the heads for storing data on the disc media surfaces in variable bit densities and a self generated physdisc lookup table based on head recording capabilities and error rate criteria, said physdisc table used by the microprocessor for controlling the allocation of data on the disc media surfaces.

Preferably, the disc drive has the capability to generate a number of unique physdisc tables, wherein the number of possible physdisc tables is equal to a value related to the number of possible bit densities raised to the power of a value related to the number of heads in the disc drive.

Another preferred embodiment of the present invention described herein is directed to a method of recording data on a data storage medium having a plurality of recording surfaces and a plurality of heads, each head associated with a particular recording surface, said method comprising the following steps: testing the heads to determine error rate characteristics for each head (such as operation 304); determining a recording frequency for each head with respect to a predetermined average frequency and maximum error rate criteria (such as 306); generating a physdisc lookup table based on the determined recording frequencies for the heads (such as 308) and using the physdisc lookup table to allocate data sectors on the recording media. The data sectors of the preferred method are referenced by both a logical block address and a physical block address.

In another preferred embodiment, the invention relates to a method of allocating data sectors on a variable bit density disc drive having multiple recording frequencies and multiple heads, said method comprising the following steps: testing the heads to determine error rate characteristics for each head (such as 302); determining a recording frequency for each head with respect to a predetermined average frequency and maximum error rate criteria (such as 304); generating a physdisc lookup table based on the determined recording frequencies for the heads (such as 306); and allocating data sectors in accordance with the information in the physdisc lookup table.

Alternate Embodiments

The preceding description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention of the precise forms disclosed, obviously many modifications and variations are possible in view of the above teachings. For example, any number x of zones could be used on the discs, although x should be the same on each disc surface. However, it would also be within the skill of the technology to utilize the principles taught herein in a system wherein different number of zones may be found on one or more discs. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The present invention has been described with reference to a magnetic disc storage unit. However, the technology of the present invention is not constrained to this particular storage device and can be applied to other types of storage mediums such as but not limited to optical storage devices and the like.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An apparatus for storing computer readable information, comprising:
   a plurality of recording surfaces;
   a plurality of heads for recording data to the recording surface, wherein at least one head operates at an actual recording frequency less than the actual recording frequency of one of the other heads;
   a dynamically generated zone-frequency lookup table comprising information related to the different heads and the different recording frequencies; and
   a microprocessor controlling the allocation of data using the dynamically generated zone-frequency lookup table.

2. An apparatus as defined in claim 1 wherein:
   each head and recording surface relates to a predetermined preferred recording frequency; and
   an average value of the actual recording frequencies for the heads is not less than the predetermined preferred recording frequency.

3. An apparatus as defined in claim 1 wherein the zone-frequency table is generated following error testing of the heads.

4. An apparatus as defined in claim 3 wherein the zone-frequency table comprises information used for converting between logical block addresses and physical block addresses.

5. An apparatus as defined in claim 4 further comprising:
   a plurality of computer readable discs, each disc having two sides wherein one side of each disc comprises one of the recording surfaces.

6. An apparatus as defined in claim 5 wherein the other side of each disc comprises one of the recording surfaces.

7. An apparatus as defined in claim 5 wherein:
   each recording surface comprises a plurality of recording zones; and
   wherein the recording frequency associated with each zone differs from the recording frequency associated with the other zones.

8. An apparatus as defined in claim 7 wherein the zone-frequency lookup table comprises:
   zone boundary information related to cylinder values in each zone;
   total sectors accumulated per zone information related to a total number of sectors within each zone and previous zones;
   number of sectors per track information related to a total number of sectors in each track;
   number of sectors per cylinder information related to a total number of sectors in each cylinder; and
   total sectors accumulated per head information related to a total number of sectors within each track and previous tracks.

9. A variable bit density disc drive capable of storing computer readable data on surfaces of disc media comprising:
   a plurality of disc media surfaces;
   a plurality of heads for storing computer readable data on the disc media surfaces at variable recording frequencies;
   a microprocessor electrically connected to the heads wherein the microprocessor controls the heads for storing data on the disc media surfaces in variable bit densities; and
   a self generated zone-frequency lookup table based on head recording capabilities and error rate criteria, said zone-frequency table used by the microprocessor for controlling the allocation of data on the disc media surfaces.

10. A disc drive as defined in claim 9 further comprising the capability to generate a number of unique zone-frequency tables, said number of zone-frequency tables equal to a value related to the number of possible bit densities raised to the power of a value related to the number of heads in the disc drive.

11. A method of allocating data sectors on a variable bit density disc drive having multiple recording frequencies and multiple recording heads, the method comprising steps of:
   (a) testing the heads to determine error rate characteristics for each head;
   (b) determining a recording frequency for each head with respect to a predetermined average frequency and maximum error rate criteria;
   (c) dynamically generating a zone-frequency lookup table based on the determined recording frequencies for the heads; and
   (d) allocating data sectors in accordance with the information in the zone-frequency lookup table.

12. A method of allocating sectors in a variable bit density storage device as defined in claim 11, wherein each read/write head corresponds to a disc surface, the method further comprising:
   developmental steps comprising:
      determining the zone boundaries for each recording head; and
      determining the maximum number of sectors supported by each zone; and operational steps comprising:
      calculating the number of sectors per track per head per zone;
      calculating the total number of tracks per cylinder in each zone;

calculating the total number of sectors accumulated per zone ascending;

calculating the total number of sectors accumulated for ascending head number; and calculating the total number of sectors accumulated for descending head number;

assembling a zone-frequency comprising these values; and using the zone-frequency to perform logical block address to physical cylinder, head and sector address conversions; and using the zone-frequency to perform physical cylinder, head and sector address to logical block address conversions.

13. A method of claim 11, wherein the step of performing logical block address to physical cylinder, head and sector conversions comprises the steps of:

obtaining a desired logical block address;

determining which zone said logical block address refers to;

calculating the logical block address offset into the zone to which the logical block address refers to;

calculating the cylinder address of the logical block address;

calculating the number of sectors remaining in the cylinder;

calculating the physical head address of the sector referred to by the logical block address; and making any necessary adjustments for cylinder address.

14. The method of claim 11, wherein the step of performing physical cylinder, head and sector address to logical block address conversions comprises the steps of:

determining which zone said physical address refers to;

calculating the total number of sectors up to the current cylinder address;

calculating the total number of sectors up to the current head address; and calculating the logical block address from these values.

* * * * *

UNITED STATES PATENT AND TRADEMARK OFFICE
CERTIFICATE OF CORRECTION

PATENT NO. : 6,560,052 B2
DATED : May 6, 2003
INVENTOR(S) : Ng et al.

It is certified that error appears in the above-identified patent and that said Letters Patent is hereby corrected as shown below:

Column 5,
Line 4, replace ":" with -- ; --.

Column 7,
Line 5, replace "head" with -- heads -- and insert -- will -- after "heads."

Column 14,
Line 65, replace ".," with -- , --.
Line 67, insert -- total -- before "sectors".

Column 15,
Line 4, replace "sector" with -- sectors --.
Line 9, replace "therefor" with -- therefore --.
Line 15, replace "following" with -- Following --.
Line 45, insert -- a -- before "physical".

Column 18,
Line 26, delete "is".

Column 19,
Line 28, replace "relates" with -- related --.

Column 22,
Line 56, replace "readlwrite" with -- read/write --.

Signed and Sealed this

Twenty-fifth Day of November, 2003

JAMES E. ROGAN
*Director of the United States Patent and Trademark Office*